United States Patent
Akiyama et al.

(10) Patent No.: US 9,710,681 B2
(45) Date of Patent: Jul. 18, 2017

(54) COMMUNICATIONS SYSTEM, RELAY COMMUNICATIONS DEVICE, RELAY COMMUNICATIONS DEVICE AND ELECTROMAGNETIC INDUCTION COMMUNICATIONS DEVICE COMBINATION, ELECTROMAGNETIC INDUCTION COMMUNICATIONS DEVICE, INFORMATION STORAGE MEDIUM, AND INFORMATION STORAGE MEDIUM PRODUCTION METHOD

(75) Inventors: Tomoya Akiyama, Ushiku (JP); Kei Ohsugi, Ushiku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 689 days.

(21) Appl. No.: 13/993,660

(22) PCT Filed: Dec. 13, 2011

(86) PCT No.: PCT/JP2011/078771
§ 371 (c)(1),
(2), (4) Date: Sep. 27, 2013

(87) PCT Pub. No.: WO2012/081572
PCT Pub. Date: Jun. 21, 2012

(65) Prior Publication Data
US 2014/0015649 A1    Jan. 16, 2014

(30) Foreign Application Priority Data

Dec. 13, 2010 (JP) ................................ 2010-276879
May 25, 2011 (JP) ................................ 2011-117057

(51) Int. Cl.
*H04Q 5/22* (2006.01)
*G06K 7/00* (2006.01)
(Continued)

(52) U.S. Cl.
CPC ....... *G06K 7/0008* (2013.01); *G06K 7/10425* (2013.01); *G06K 7/10435* (2013.01); *H04B 5/0031* (2013.01); *H04B 5/0075* (2013.01)

(58) Field of Classification Search
CPC ............. G06K 7/0008; G06K 7/10425; G06K 7/10435; H04B 5/0031; H04B 5/0075
See application file for complete search history.

(56) References Cited

U.S. PATENT DOCUMENTS 4,480,178 A * 10/1984 Miller, II ............. G06K 7/0008
235/380
5,221,831 A * 6/1993 Geiszler ................. B65G 47/50
235/440
(Continued)

FOREIGN PATENT DOCUMENTS

CN        1950835 A     4/2007
CN      101095146 A    12/2007
(Continued)

OTHER PUBLICATIONS

International Search Report of PCT/JP2011/078771.
(Continued)

*Primary Examiner* — Ryan Sherwin
(74) *Attorney, Agent, or Firm* — Locke Lord LLP; Howard M. Gitten

(57) ABSTRACT

An object of the present invention is to provide a communication system, a relay communication device, a combination of the relay communication device and the electromagnetic induction communication device, an electromagnetic induction communication device, an information storage medium, and an information storage medium manufacturing method, in which a communication system communicating through electromagnetic induction can be implemented at low cost. A relay automatic ticket gate system provides the following. An IC card 40 includes an IC chip capable of
(Continued)

communicating through electromagnetic induction, and a pair of conductive plates. A relay communication device includes a relay loop antenna, and a pair of conductive rails. An electromagnetic induction ticket gate communicates through electromagnetic induction between a ticket gate loop antenna communicating with a relay loop antenna through electromagnetic induction, and a relay communication device. A ticket gate control unit executes processing of communication with the IC chip.

13 Claims, 18 Drawing Sheets

(51) Int. Cl.
H04B 5/00 (2006.01)
G06K 7/10 (2006.01)

(56) References Cited

U.S. PATENT DOCUMENTS

| | | | | |
|---|---|---|---|---|
| 5,929,760 A | * | 7/1999 | Monahan | G06K 7/10316 340/572.1 |
| 6,097,292 A | * | 8/2000 | Kelly | G06K 7/0008 235/385 |
| 6,107,921 A | * | 8/2000 | Eberhardt | G06K 7/0008 340/572.1 |
| 6,216,954 B1 | * | 4/2001 | Kuwamoto | G06K 7/0008 235/486 |
| 6,611,199 B1 | | 8/2003 | Geiszler et al. | |
| 7,004,399 B2 | * | 2/2006 | Maeda | G06K 7/10316 235/384 |
| 7,180,423 B2 | | 2/2007 | Forster et al. | |
| 7,333,786 B2 | * | 2/2008 | Kikuchi | G06K 7/0008 340/10.1 |
| 7,439,863 B2 | * | 10/2008 | Suzuki | G06K 7/10178 340/572.7 |
| 7,893,814 B2 | * | 2/2011 | Collins | G06K 7/10326 340/10.1 |
| 8,260,199 B2 | * | 9/2012 | Kowalski | G06K 7/10178 235/462.25 |
| 8,380,124 B2 | * | 2/2013 | Takei | H04B 5/00 455/41.1 |
| 8,456,307 B2 | | 6/2013 | Suguro et al. | |
| 2006/0145861 A1 | | 7/2006 | Forster et al. | |
| 2007/0284759 A1 | | 12/2007 | Suguro et al. | |

FOREIGN PATENT DOCUMENTS

| | | |
|---|---|---|
| JP | 2000-123121 A | 4/2000 |
| JP | 2003067676 A | 3/2003 |
| JP | 2005339501 A | 12/2005 |
| JP | 2009-135632 A | 6/2009 |

OTHER PUBLICATIONS

Office Action dated Sep. 6, 2015 in Chinese Application No. 20118006004.3.
Notice of Reasons for Rejection dated Jun. 17, 2016 in Japanese Application No. 2011-117057.
Partial Supplementary European Search Report for European Patent Application No. 11849119.0 dated Apr. 8, 2016.

* cited by examiner

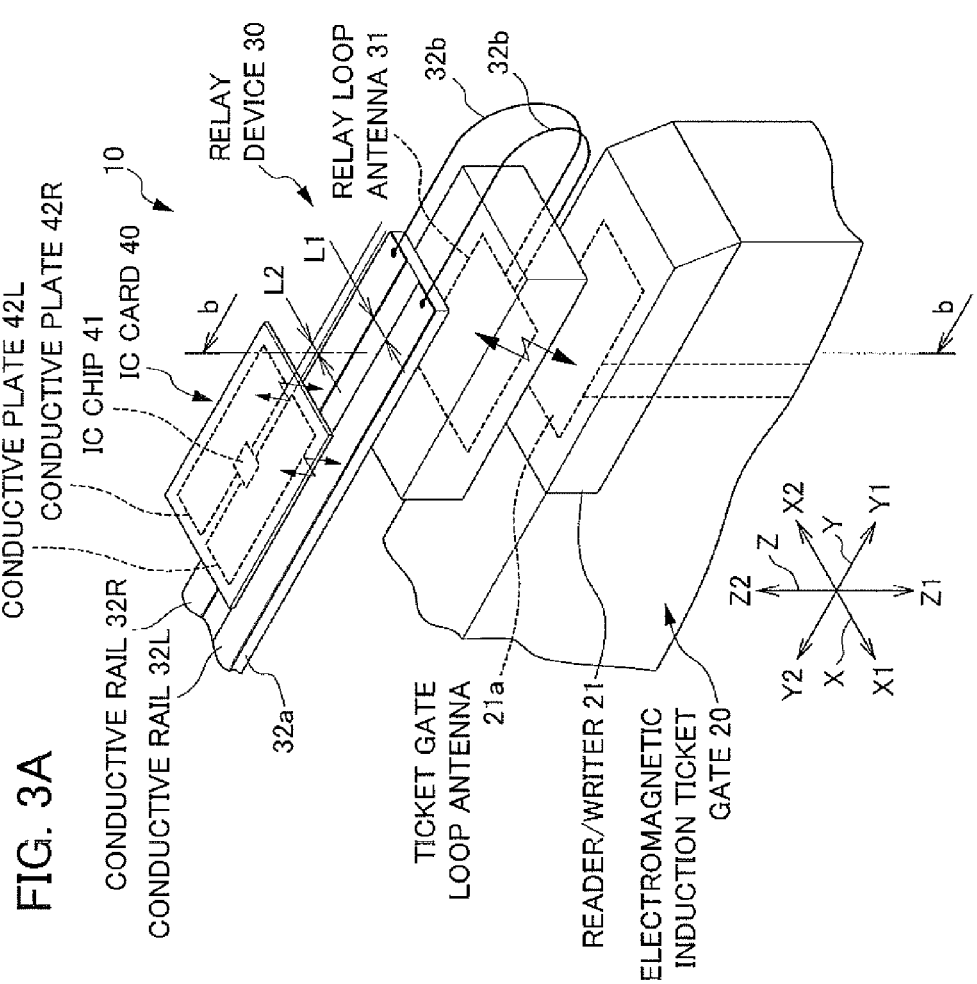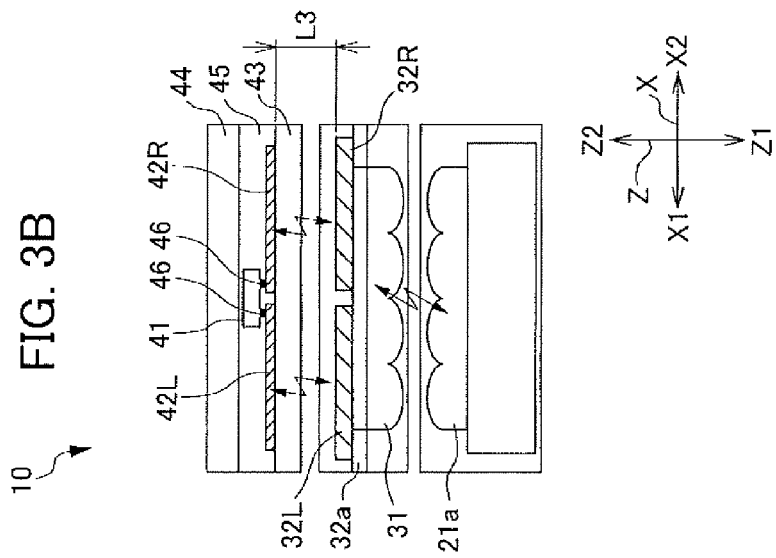

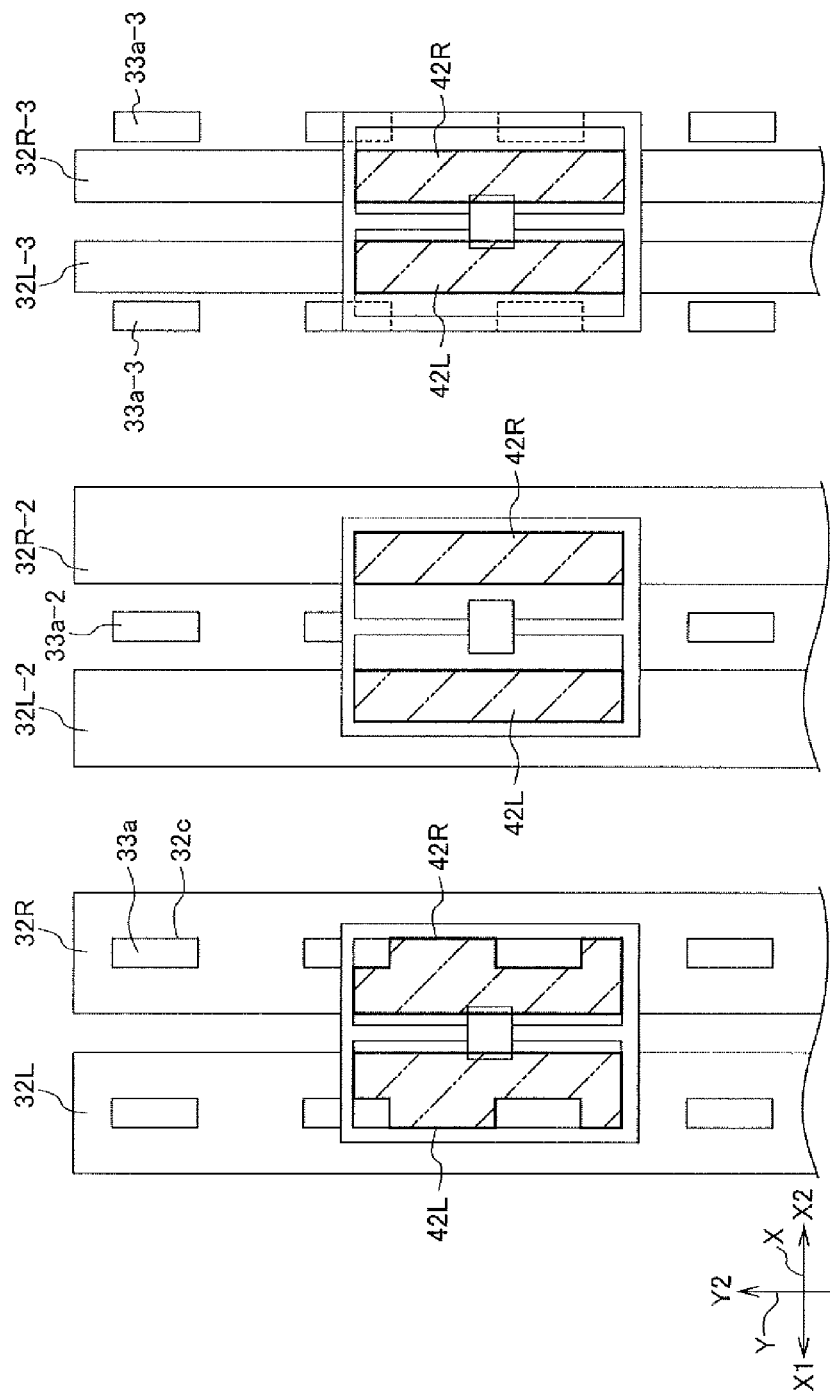

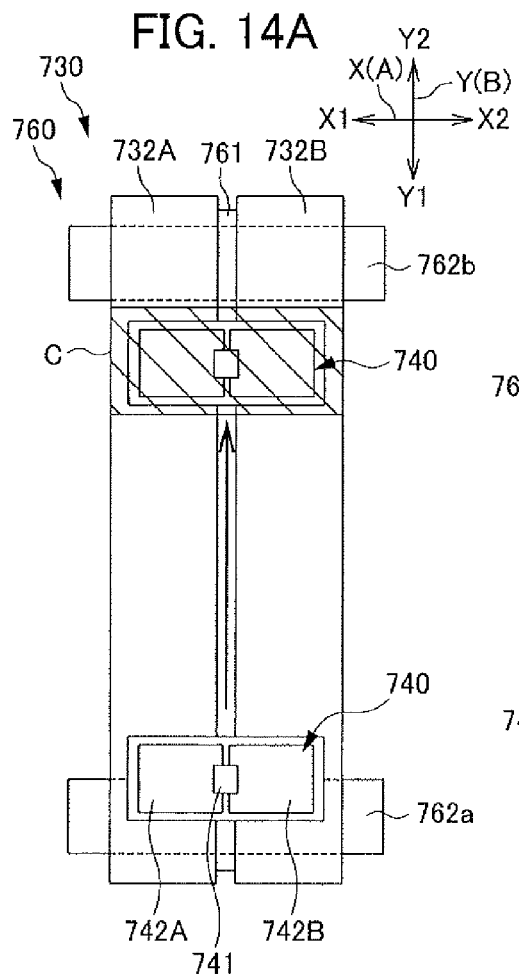
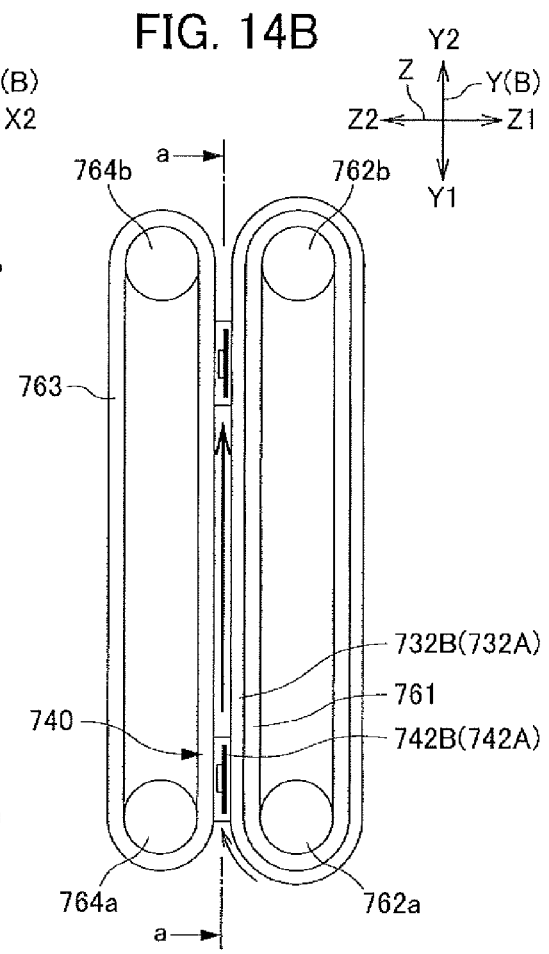
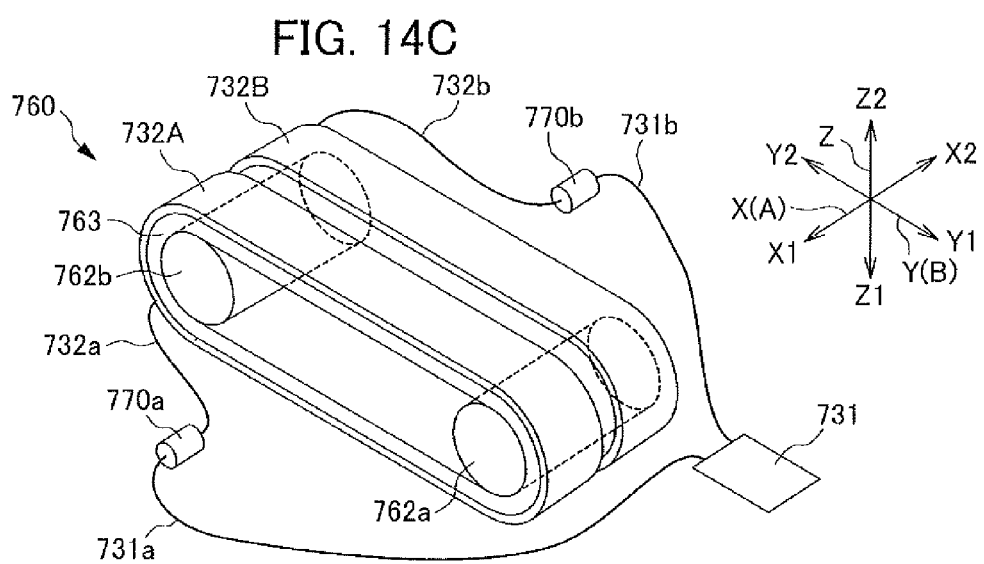

COMMUNICATIONS SYSTEM, RELAY COMMUNICATIONS DEVICE, RELAY COMMUNICATIONS DEVICE AND ELECTROMAGNETIC INDUCTION COMMUNICATIONS DEVICE COMBINATION, ELECTROMAGNETIC INDUCTION COMMUNICATIONS DEVICE, INFORMATION STORAGE MEDIUM, AND INFORMATION STORAGE MEDIUM PRODUCTION METHOD

TECHNICAL FIELD

The present invention relates to a communication system, a relay communication device, a combination of the relay communication device and the electromagnetic induction communication device, an electromagnetic induction communication device, an information storage medium, and an information storage medium manufacturing method, all of which utilize electromagnetic induction.

BACKGROUND ART

Conventionally, there is a communication system that reads (or writes) a user's IC card through electromagnetic induction (for example, Patent Document 1). The IC card of such a communication system is configured by an IC chip and an antenna coil having at least a contactless communication function, and the IC chip provided within the IC card implements transmission and reception of data by receiving driving power through signals transmitted from the reader/writer, receiving an analog signal transmitted from the reader/writer, converting the analog signal into a digital signal, and sending back a response signal. The contactless IC cards are used in various systems such as a transportation system, an electronic money system, an employee ID card system, and a physical distribution management system.

As a communication scheme using a contactless IC card, an electromagnetic coupling scheme, an electrostatic coupling scheme, an electromagnetic induction scheme, and a radio wave scheme are used depending on the communication frequency band, and the electromagnetic induction scheme is the mainstream for contactless IC communication systems in the form of a card.

However, since an antenna coil of an IC card is formed by etching or the like in electromagnetic induction communication systems, the cost thereof has been high.

On the other hand, there is a communication system that reads (or writes) a user's IC card through electrostatic coupling (for example, Patent Document 2).

However, the communication distance between the information storage medium and the reader/writer in the electrostatic coupling communication system is shorter than that in the electromagnetic induction communication system. Therefore, whereas the electromagnetic induction communication system initiates communication in a state where the information storage medium is at some distance from the reader/writer, the electrostatic coupling communication system does not initiate communication unless the information storage medium is substantially in close contact with the reader/writer. Therefore, even if the communication time between the information storage medium and the reader/writer is equal to the communication time in the electromagnetic induction communication system, the user actually feels the processing time as being longer by a period of time required for approximating the information storage medium to the reader/writer at a closer distance. As a result, if the electrostatic coupling communication system is utilized in, for example, an automatic ticket gate, the gate may be congested.

Patent Document 1: Japanese Unexamined Patent Application, Publication No. 2000-123121

Patent Document 2: Japanese Unexamined Patent Application, Publication No. 2009-135632

DISCLOSURE OF THE INVENTION

Problems to be Solved by the Invention

A problem to be solved by the present invention is to provide a communication system, a relay communication device, a combination of the relay communication device and the electromagnetic induction communication device, an electromagnetic induction communication device, an information storage medium, and an information storage medium manufacturing method, in which a communication system communicating through electromagnetic induction or electromagnetic coupling can be implemented at low cost.

Means for Solving the Problems

The present invention solves the problem by the following means for solving the problem. For the purpose of facilitating comprehension, descriptions are provided by assigning reference numerals to members corresponding to those in the embodiments of the present invention; however, the present invention is not limited thereto. Configurations to be described with reference numerals may be appropriately improved, or may be at least partly replaced with other configurations.

A first aspect of the present invention is a communication system (1), in which a relay communication device (30, 230) intervenes between an information storage medium (40, 240) and an electromagnetic induction communication device (20), and the communication system (1) performs communication while conveying the information storage medium. The information storage medium includes an IC chip (41) being capable of communicating through electromagnetic induction or electromagnetic coupling; and a pair of conductive plates (42L, 42R, 242L, 242R) having conductivity and being connected to the IC chip. The relay communication device includes: a relay loop antenna (31); and a pair of conductive rails (32L, 32R, 232L, 232R) having conductivity, being connected to both ends of the relay loop antenna, being provided as rails along a conveyance direction (Y) of the information storage medium, and coupling electrostatically with the pair of conductive plates of the information storage medium. The electromagnetic induction communication device includes: a communication device side loop antenna (21a) that communicates with the relay loop antenna through electromagnetic induction or electromagnetic coupling; and a control unit (27) that executes processing of communication with the IC chip of the information storage medium, as a result of the communication device side loop antenna communicating with the relay communication device through electromagnetic induction or electromagnetic coupling, and the relay communication device electrostatically coupling with the information storage medium.

A second aspect of the present invention is the communication system according to the first aspect, in which the pair of conductive plates (42L, 42R, 242L, 242R) of the information storage medium (40, 240) is arranged in parallel in a direction (X) orthogonal to the conveyance direction (Y).

A third aspect of the present invention is the communication system according to the first or second aspect, in which the relay communication device (30, 230) includes a conveyance device (33, 233) that conveys the information storage medium (40, 240) in the conveyance direction (Y).

A fourth aspect of the present invention is the communication system according to any one of the first to third aspects, in which the relay communication device (230) includes: an insertion slot (234), into which a user inserts the information storage medium (240); and an alignment device (234c) that aligns the information storage medium inserted into the insertion slot, such that a direction of aligning the pair of conductive plates (242L, 242R) coincides with a direction (X) orthogonal to the conveyance direction (Y).

A fifth aspect of the present invention is the communication system according to any one of the first to fourth aspects, in which the information storage medium (240) having the conductive plates (242L, 242R) has a rectangular shape, the pair of conductive plates is arranged in parallel in a direction along a long side (242a) of the rectangular shape, and the relay communication device (230) conveys the information storage medium, such that the conveyance direction (Y) of the information storage medium is orthogonal to the long side of the rectangular shape of the information storage medium.

A sixth aspect of the present invention is the communication system according to any one of the first to fifth aspects, in which the relay communication device (30, 230) includes a plurality of rollers (33a), which are disposed in a plurality of openings (32c) provided on a surface of the conductive rails (32L, 32R, 232L, 232R), and which are arranged in the conveyance direction (Y) of the information storage medium (40, 240).

A seventh aspect of the present invention is the communication system according to any one of the first to sixth aspects, in which the relay communication device (30, 230) has a communication result determination range (A1) on the pair of conductive rails (32L, 32R, 232L, 232R), the range being an area for determining a communication processing result. The relay communication device includes a notification unit (23, 24) which is provided to the electromagnetic induction communication device (20) or the relay communication device, and which notifies a communication processing result; and a communication result determination control unit (27, 37), which is provided to the electromagnetic induction communication device or the relay communication device, and which determines a communication processing result in a case in which the information storage medium (40, 240) is conveyed to the communication result determination range. In a case in which the communication processing result is determined to be failure, the communication result determination control unit controls the notification unit to notify a failure occurrence. In a case in which communication processing is being performed, the communication result determination control unit continues the communication processing until the communication processing is completed, and in a case in which the communication processing result is determined to be failure, the communication result determination control unit controls the notification unit to notify a failure occurrence.

An eighth aspect of the present invention is a relay communication device (30, 230), which intervenes between an information storage medium (40, 240) and an electromagnetic induction communication device (20) provided in a communication system (1), and which performs communication while conveying the information storage medium. The relay communication device includes a relay loop antenna (31) that communicates with a communication device side loop antenna (21a) of the electromagnetic induction communication device through electromagnetic induction or electromagnetic coupling; and a pair of conductive rails (32L, 32R, 232L, 232R) having conductivity, being connected to both ends of the relay loop antenna, being provided as rails along a conveyance direction (Y) of the information storage medium, communicating through electrostatic coupling with a pair of conductive plates (42L, 42R, 242L, 242R) which have conductivity and which are connected to an IC chip (41) which is provided to the information storage medium and which is capable of communicating through electromagnetic induction or electromagnetic coupling.

A ninth aspect of the present invention is the relay communication device according to the eighth aspect, further including a conveyance device (33, 233) that conveys the information storage medium (40, 240) in the conveyance direction (Y).

A tenth aspect of the present invention is the relay communication device according to the eighth or ninth aspect, further including: an insertion slot (234), into which a user inserts the information storage medium; and an alignment device (234c) that aligns the information storage medium inserted into the insertion slot, such that a direction of aligning the pair of conductive plates (242L, 242R) coincides with a direction (X) orthogonal to the conveyance direction (Y).

An eleventh aspect of the present invention is the relay communication device according to any one of the eighth to tenth aspects, in which the information storage medium (240) having the conductive plates (242L, 242R) has a rectangular shape, the pair of conductive plates is arranged in parallel in a direction along a long side of the rectangular shape (242a), and the information storage medium is conveyed, such that the conveyance direction (Y) of the information storage medium is orthogonal to a long side of the information storage medium.

A twelfth aspect of the present invention is the relay communication device according to any one of the eighth to eleventh aspects, further including a plurality of rollers (33a), which are disposed in a plurality of openings (32c) provided on a surface of the conductive rails (32L, 32R, 232L, 232R), and which are arranged in the conveyance direction (Y) of the information storage medium (40, 240).

A thirteenth aspect of the present invention is the relay communication device according to any one of the eighth to twelfth aspects, in which a communication result determination range (A1) is provided on the pair of conductive rails (32L, 32R, 232L, 232R), the range being an area for determining a communication processing result. The electromagnetic induction communication device (20) or the relay communication device (30) includes: a notification unit (23, 24) that notifies a communication processing result; and a communication result determination control unit (27, 37) that determines a communication processing result in a case in which the information storage medium is conveyed to the communication result determination range. In a case in which the communication processing result is determined to be failure, the communication result determination control unit controls the notification unit to notify failure occurrence. In a case in which communication processing is being performed, the communication result determination control unit continues the communication processing until the communication processing is completed; and in a case in which the communication processing result is determined to be failure, the communication result determination control unit controls the notification unit to notify failure occurrence.

A fourteenth aspect of the present invention is a combination of a relay communication device and an electromagnetic induction communication device, the combination including: the electromagnetic induction communication device (20) according to any one of the eighth to thirteenth aspects, and the relay communication device (30, 230) according to any one of the eighth to thirteenth aspects.

A fifteenth aspect of the present invention is an electromagnetic induction communication device used in the communication system according to any one of the first to seventh aspects, including the communication device side loop antenna (21*a*) and the control unit (27).

A sixteenth aspect of the present invention is an information storage medium used in the communication system according to any one of the first to seventh aspects, including the IC chip (41) and the pair of conductive plates (42L, 42R, 242L, 242R).

A seventeenth aspect of the present invention is an information storage medium manufacturing method for manufacturing an information storage medium used by a communication system that includes: an electromagnetic induction communication device (320, 520, 620, 920) having a communication device side loop antenna (321*a*, 721*a*, 821*a*, 921*a*) that communicates through electromagnetic induction or electromagnetic coupling, and a control unit (327, 727, 827, 927) that executes communication processing via the communication device side loop antenna; and a relay communication device (330, 730, 830, 930) that includes a relay loop antenna (331, 731, 831, 931) that communicates with the communication device side loop antenna through electromagnetic induction or electromagnetic coupling, and a pair of relay conductive members having conductivity, being connected to both ends of the relay loop antenna, and being disposed through a slit. The information storage medium is arranged in a medium arrangement direction being a single direction, and executes processing of communication with the control unit of the electromagnetic induction communication device via the relay communication device. The method includes: a conductive plate forming step of forming a plurality of combinations of a pair of electrically independent conductive plates (342A, 342B, 442A, 442B, 542A, 542B, 742A, 742B, 842A, 842B, 942A, 942B) so as to be separated from each other on an insulating base material; and an IC chip disposing step of disposing an IC chip (341, 441, 541, 741) capable of communicating through electromagnetic induction or electromagnetic coupling, to the pair of conductive plates formed in the conductive plate forming step, so as to straddle a slit between the pair of conductive plates.

An eighteenth aspect of the present invention is the information storage medium manufacturing method according to the seventeenth aspect, further including a conductive thin plate forming step of forming a conductive thin plate (350, 450A, 450B, 550) on the insulating base material, in which the conductive plate forming step includes a conductive thin plate removing step of separating the conductive plates by removing a removal area that is a part of the conductive thin plate formed in the conductive thin plate forming step.

A nineteenth aspect of the present invention is the information storage medium manufacturing method according to the eighteenth aspect in which, in the conductive thin plate removing step, the removal area that is a part of the conductive thin plate (350, 450A, 450B, 550) is removed by cutting.

A twentieth aspect of the present invention is the information storage medium manufacturing method according to the nineteenth aspect, in which an arrangement direction of the pair of conductive plates (342A, 342B) is an orthogonal direction (A) orthogonal to the medium arrangement direction, and the conductive thin plate removing step includes: a medium arrangement direction removing step of forming the slit by removing a removal area by cutting along the medium arrangement direction; and an orthogonal direction removing step of removing a removal area by cutting along the orthogonal direction.

A twenty-first aspect of the present invention is the information storage medium manufacturing method according to nineteenth aspect, in which an arrangement direction (442A, 442B) of the pair of conductive plates is an orthogonal direction (A) orthogonal to the medium arrangement direction, and in the conductive thin plate forming step, the pair of conductive thin plates (450A, 450B) are formed on the insulating base material in parallel in the medium arrangement direction so as to provide the slit, and the conductive thin plate removing step includes an orthogonal direction removing step of removing the removal area by cutting along the orthogonal direction of the conductive thin plate.

A twenty-second aspect of the present invention is the information storage medium manufacturing method according to nineteenth aspect, in which an arrangement direction (542A, 542B) of the pair of conductive plates is the medium arrangement direction (B), and the conductive thin plate removing step includes: a between-pair-of-plate removing step of forming the slit by removing a removal area between the pair of conductive plates by cutting along the orthogonal direction orthogonal to the medium arrangement direction; and a between-combination removing step of removing a removal area between the plurality of combinations by cutting along the orthogonal direction.

A twenty-third aspect of the present invention is the information storage medium manufacturing method according to eighteenth aspect in which, in the conductive thin plate removing step, the removal area is removed by etching.

A twenty-fourth aspect of the present invention is the information storage medium manufacturing method according to any one of the seventeenth to twenty-third aspects, in which, in the conductive plate forming step, the conductive plates are formed by electroplating.

A twenty-fifth aspect of the present invention is the information storage medium manufacturing method according to any one of the seventeenth to twenty-third aspects in which, in the conductive plate forming step, the conductive plates are formed by conductive ink printing.

A twenty-sixth aspect of the present invention is the information storage medium manufacturing method according to any one of the seventeenth to twenty-fifth aspects in which, in the conductive plate forming step, an interval (L5) between the conductive plates adjacent in the medium arrangement direction is made sufficiently larger than the slit (340*a*, 440*a*, 540*a*) between the pair of conductive plates.

A twenty-sixth aspect of the present invention is the information storage medium manufacturing method according to any one of the seventeenth to twenty-sixth aspects, further including a cutting-into-piece step of cutting the information storage medium (340, 440, 540) into pieces by cutting the insulating base material between the combinations.

Effects of the Invention

According to the present invention, the following effects can be achieved.

In the first and eighth aspects of the present invention, the relay communication device includes: the relay communication device side loop antenna that communicates with the electromagnetic induction communication device through electromagnetic induction or electromagnetic coupling; and the pair of conductive rails that communicate with the information storage medium through electrostatic coupling. As a result, driving power can be transmitted to the electronic information storage medium, transmission data from the electromagnetic induction communication device can be transferred to the electronic information storage medium, and reply data from the electronic information storage medium can be transmitted via the relay communication device to the electromagnetic induction communication device.

In the first and eighth aspects of the present invention, it is not necessary to form a loop antenna in the information storage medium, and only the two conductive plates are necessary to be provided; therefore, an antenna forming step such as conventional complicated etching is not necessary, and the information storage medium can be manufactured at low cost. As a result, as the amount of producing the information storage medium is increased, from a cost perspective this is advantageous compared to conventional systems, and the system can be constructed at low cost.

In the first and eighth aspects of the present invention, the system can be constructed by diverting a mass-marketed electromagnetic induction communication device utilizing an electromagnetic induction or electromagnetic coupling scheme; therefore, the system can be introduced at low cost. In other words, an IC chip for mass-marketed electromagnetic induction or electromagnetic coupling contactless IC cards can be diverted to the IC chip of the information storage medium, and a reader/writer for existing contactless IC cards can be diverted to the electromagnetic induction communication device. As a result, the system can be constructed without the need to newly develop a special IC chip and reader/writer for electrostatic coupling.

In the first and eighth aspects of the present invention, in a case in which the information storage medium is conveyed, it is possible to maintain a state where the conductive rails provided to the relay communication device face in proximity to the conductive plates provided to the information storage medium. As a result, the communication processing can be executed while conveying the information storage medium; therefore, the gate access processing time, etc. can be shortened.

In the first and eighth aspects of the present invention, only the pair of conductive plates is necessary to be provided to the information storage medium; therefore, the external size of the information storage medium can be reduced as compared to a case of providing a loop antenna to an information storage medium. As a result, the information recording mediums can be manufactured at further lower cost.

In the second aspect of the present invention, the pair of conductive plates of the information storage medium is arranged in parallel in the direction orthogonal to the conveyance direction; therefore, when the information storage medium is conveyed, the communication processing can be executed in a state where the conductive plates constantly face the conductive rails.

The third and ninth aspects of the present invention provide the conveyance device for the information storage medium; therefore, the communication processing can be executed while automatically conveying the information storage medium, in a state where the conductive plates provided to the information storage medium face the conductive rails provided to the relay communication device.

The fourth and tenth aspects of the present invention provide the alignment device for the inserted information storage medium; therefore, even if the user inserts the information storage medium in a rotated manner, the information storage medium can be aligned, and the communication stability can be improved.

In the fifth and eleventh aspects of the present invention, the conductive plates are arranged in parallel in the direction along the long side of the information storage medium, and the conveyance direction is orthogonal to the long side of the information storage medium; therefore, even if the information storage medium is deviated in a direction (the long side direction) orthogonal to the conveyance direction, it is possible to decrease the reduction of the area in which the conductive plates face the conductive rails; accordingly, the tolerance of positional deviation can be improved, and the communication stability can be improved.

In the sixth and twelfth aspects of the present invention, the plurality of rollers are arranged in the conveyance direction in the opening of the conductive rails; therefore, it is possible to increase the area in which the conductive plates face the conductive rails, and the communication stability can be improved.

In the seventh and thirteenth aspects of the present invention, the pair of conductive rails include the communication result determination range which is an area for determining a communication processing result; in a case in which the information storage medium is conveyed to the communication result determination range, when the communication processing result is determined to be failure, the notification unit is controlled to notify a failure occurrence; therefore, the communication processing time need not to coincide with the conveyance speed, and the failure occurrence resulting from communication processing delay can be reduced.

The fourteenth aspect of the present invention is the combination of the relay communication device and the electromagnetic induction communication device, the combination including: the electromagnetic induction communication device according to any one of the eighth to thirteenth aspects, and the relay communication device according to any one of the eighth to thirteenth aspects; therefore, the effects similar to those of the eighth to thirteenth aspects are achieved.

The fifteenth aspect of the present invention is the electromagnetic induction communication device used in the communication system according to any one of the first to seventh aspects, including the communication device side loop antenna and the control unit; therefore, effects similar to those of the first to seventh aspects are achieved.

The sixteenth aspect of the present invention is the information storage medium used in the communication system according to any one of the first to seventh aspects, including the IC chip and the pair of conductive plates; therefore, the effects similar to those of the first to seventh aspects are achieved.

Furthermore, the present invention achieves the following effects.

In the seventeenth aspect of the present invention, the relay communication device includes: the relay communication device side loop antenna that communicates with the electromagnetic induction communication device through electromagnetic induction or electromagnetic coupling; and the relay conductive member capable of communicating signals with the information storage medium through electrostatic coupling. Therefore, effects similar to those of the first aspect are achieved.

In the seventeenth aspect of the present invention, the plurality of IC chips are disposed by forming the plurality of combinations of electrically independent pairs of conductive plates; therefore, each combination is mutually electrically independent after disposing the IC chips on the base material. Therefore, by approximating or directly contacting the test probe with the conductive plates, function testing, connection state testing, etc. for each IC chip can be concurrently carried out, and the test efficiency can be improved.

In the seventeenth aspect of the present invention, in a case in which the information storage medium is cut into a piece, the separated potion of the base material is cut; therefore, the conductive plates formed of metal foil or the like need not be cut, and the deterioration of the cutting blade can be suppressed.

Moreover, in the seventeenth aspect of the present invention, the conductive plates are separated from each other; therefore, by cutting the information storage medium into pieces by cutting the base material of the separated portion between the adjacent combinations, the conductive plates are not exposed to the outer periphery of the information storage medium. Therefore, the damage to the IC chip can be reduced if overvoltage is externally applied thereto by static electricity or the like. In a case in which the information storage medium is touched by a hand or the like, it is possible to prevent operational malfunction of the IC chip caused by electrical connection with the conductive plates through a human body.

In the eighteenth aspect of the present invention, the conductive plates are separated from each other by removing the removal area after disposing the conductive thin plate on the insulating base material; therefore, the steps can be simplified as compared to a case in which pre-separated conductive plates are disposed on a substrate. It is difficult to dispose separated conductive plates on a substrate with high accuracy; however, in the present invention, for example, it is only necessary to remove a linear removal area; therefore, the processing is simple, and it is easy to improve the accuracy of intervals between the conductive plates as well.

In the nineteenth aspect of the present invention, the removal area is removed by cutting; therefore, in a case of separating each cut piece, the portion of the insulating base material between the combinations may be cut. Therefore, the conductive plates need not be cut, and the deterioration of the cutting blade can be suppressed. Whereas etching techniques include many steps (a resist forming step, an etching treatment step, a cleaning process, etc.), the cutting technique includes only the cutting step with the cutting blade; therefore, the steps can be shortened, and the processing cost can be reduced.

In the twentieth aspect of the present invention, in the medium arrangement direction removing step, the removal area between the pair of conductive plates is removed by cutting along the medium arrangement direction; therefore, the slit between the pair of conductive plates can be manufactured for the plurality of pairs of the combination portion in a single step, by cutting along the medium arrangement direction.

In the short-side direction removing step, since the removal area between the plurality of combinations is removed by cutting along the orthogonal direction, the separated portion between the adjacent combinations can be manufactured.

In the twenty-first aspect of the present invention, the pair of conductive thin plates is disposed on the insulating base material so as to provide the slit; therefore, a step of forming a slit between the pair of conductive plates is unnecessary, and the steps can be shortened.

In the twenty-second aspect of the present invention, the arrangement direction of the pair of conductive plates is the medium arrangement direction, and the cutting direction in the between-pair-of-plate removing step and the between-combination removing step are both the orthogonal direction; therefore, these can be processed in a single step, and the steps can be shortened.

In the twenty-third aspect of the present invention, the removal area is removed by etching; therefore, the slit width between the pair of conductive plates can be narrowed, and even a small IC chip can be mounted. Since the interval between the conductive plates between the adjacent combinations can be widened, it is possible to widen the cutting accuracy margin when the information storage medium is cut into pieces by cutting the base material, and the workability can be improved.

In the twenty-fourth aspect of the present invention, the conductive plates are formed by electroplating; therefore, the slit width between the pair of conductive plates can be narrowed, even a small IC chip can be mounted, and the conductive layer can be thinned, and thus can be formed at low cost. Since the interval between the conductive plates between the adjacent combinations can be widened, it is possible to widen the cutting accuracy margin when the information storage medium is cut into pieces by cutting the base material, and the workability can be improved.

In the twenty-fifth aspect of the present invention, the conductive plates are formed by conductive ink printing; therefore, the slit width between the pair of conductive plates can be narrowed, even a small IC chip can be mounted, and the conductive layer can be thinned, and thus can be formed by a low cost manufacturing method. Since the interval between the conductive plates between the adjacent combinations can be widened, it is possible to widen the cutting accuracy margin when the information storage medium is cut into pieces by cutting the base material, and the workability can be improved.

In the twenty-sixth aspect of the present invention, the interval between the conductive plates adjacent in the medium arrangement direction is larger than the interval between the pairs of conductive plates; therefore, it is possible to widen the cutting accuracy margin when the information storage medium is cut into pieces by cutting the base material, and the workability can be improved.

In the twenty-seventh aspect of the present invention, the information storage medium is cut into pieces by cutting the insulating base material between the combinations; therefore, similarly to the first aspect of the present invention, the conductive plates are not exposed to the outer periphery of the information storage medium, the damage to IC chip can be reduced, and operational malfunction of the IC chip can be prevented.

BRIEF DESCRIPTION OF THE DRAWINGS

FIG. 3 is an exploded perspective view in a vicinity of a reader/writer 21 of the first embodiment, and a cross-sectional view illustrating communication among an electromagnetic induction ticket gate 20, a relay communication device 30 and an IC card 10;

FIG. 5 is a plan view illustrating an area in which conductive rails face conductive plates;

FIG. 14 is a diagram illustrating an internal configuration of a relay communication device 730 of a seventh embodiment;

Figure 1:
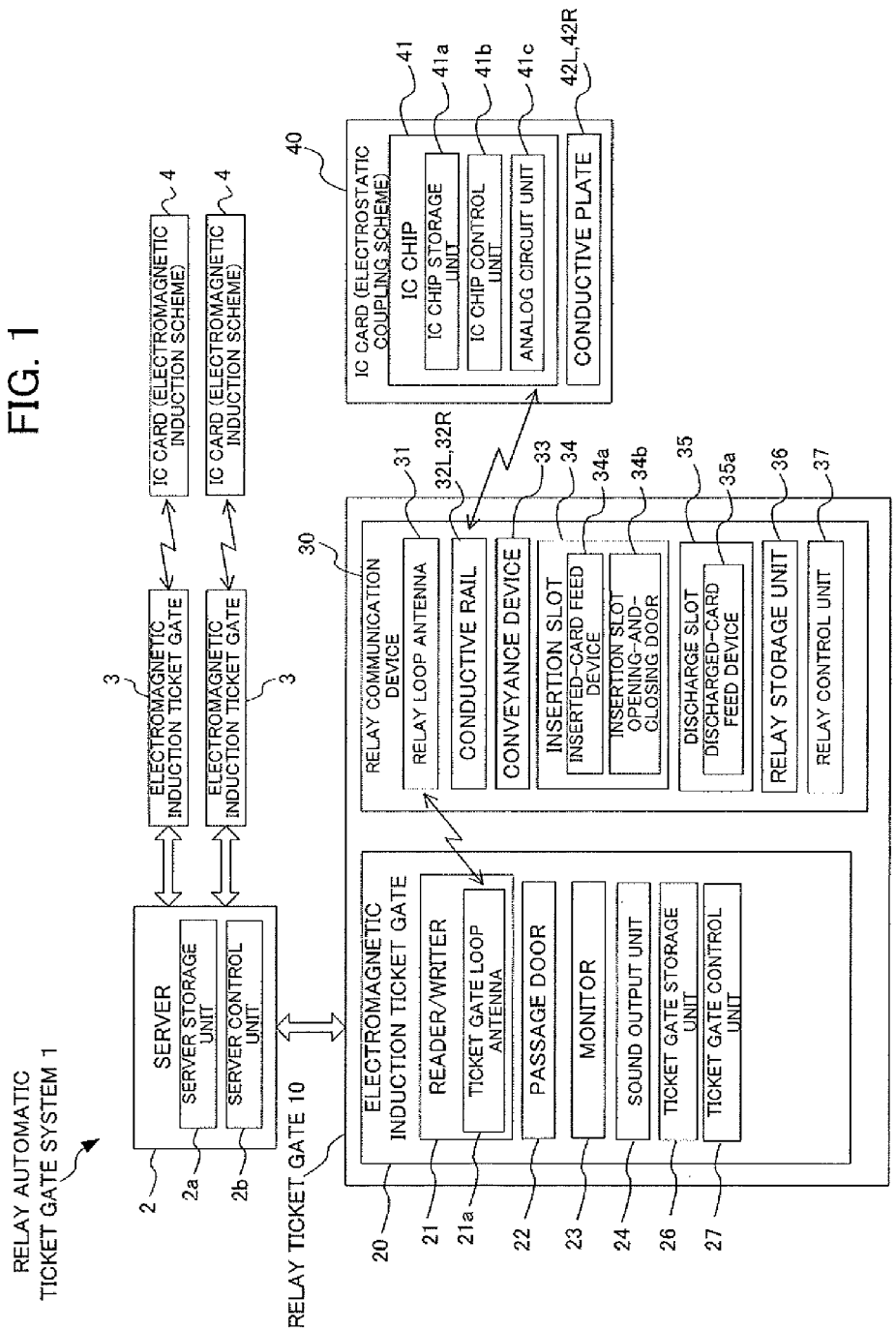
FIG. 1 is a block diagram of a relay automatic ticket gate system 1 of a first embodiment.

EXPLANATION OF REFERENCE NUMERALS 1, 701, 801 . . . relay automatic ticket gate system
10, 210, 810, 910 . . . relay ticket gate
20, 720, 820 . . . electromagnetic induction ticket gate
21, 321, 721, 821, 921 . . . reader/writer
21a, 731, 831 . . . ticket gate loop antennas
30, 230, 330, 730, 830, 930 . . . relay communication device
31 . . . relay loop antenna
32L, 32R . . . conductive rail
33 . . . conveyance device
33a . . . lower roller
33b . . . upper roller
37 . . . relay control unit
40, 240, 340, 440, 540, 740, 840, 940 . . . IC card
41, 341, 441, 541, 741 . . . IC chip
42L, 42R, 242L, 242R, 342A, 342B, 442A, 442B, 542A, 542B,
742A, 742B, 842A, 842B, 942A, 942B . . . conductive plate
234 . . . insertion slot
234c, 235c . . . IC card alignment device
A1 . . . suspension range
310, 710 . . . communication system
321a, 721a, 821a, 921a . . . R/W loop antenna
326, 926 . . . storage unit
327, 927 . . . control unit
331, 931 . . . relay loop antenna
332A, 332B, 732A, 732B, 832A, 832B, 932A, 932B . . . conductive member
343, 443, 543, 543 . . . lower layer
344, 444, 544 . . . upper layer
350, 450A, 450B, 550, 650A, 650B . . . conductive thin plate
760, 860, 960 . . . conveyance device

PREFERRED MODE FOR CARRYING OUT THE INVENTION

First Embodiment

Descriptions are hereinafter provided for a first embodiment of the present invention with reference to the drawings, etc.

FIG. 1 is a block diagram of a relay automatic ticket gate system 1 of the first embodiment.

The relay automatic ticket gate system 1 is a ticket gate system that is used in entrance/exit gates for train services, etc. The relay automatic ticket gate system 1 is configured by connecting a relay ticket gate 10 to a server 2 in a conventional system, to which the server 2 and a plurality of electromagnetic induction ticket gates 3 are connected. A ticket, a commuter ticket, etc. that are used in the relay automatic ticket gate system 1 are IC cards 4 and 40 (information storage medium) with a built-in IC chip.

The server 2 includes a server storage unit 2a and a server control unit 2b.

The server storage unit 2a is a storage device such as a hard disk and/or a semiconductor memory element that stores programs, information, etc. required for operations of the server 2.

The server storage unit 2a stores, for example, information (a train line section, an expiration date, the user's name) of the IC cards 4 and 40. The information of the server storage unit 2a is appropriately referred to in a case in which, for example, the IC cards 4 and 40 are reissued by a ticket vending machine, etc.

The server control unit 2b is a control unit for centrally controlling the server 2, and is configured by a CPU or the like, for example. The server control unit 2b appropriately reads and executes various programs that are stored in the server storage unit 2a.

The electromagnetic induction ticket gate 3 is a conventional electromagnetic induction ticket gate, and can transmit and receive information to and from the electromagnetic induction IC card 4.

The relay ticket gate 10 is configured by adding a relay communication device 30 to a conventional electromagnetic induction ticket gate 20 (electromagnetic induction communication device). The relay ticket gate 10 can transmit and receive information between the electromagnetic induction ticket gate 20 and an electrostatic coupling (electrostatic capacity coupling) IC card 40 via the relay communication device 30.

The relay automatic ticket gate system 1 may be configured by only the plurality of relay ticket gates 10, without utilizing the electromagnetic induction ticket gate 3. The relay ticket gate 10 may be a newly and exclusively provided integral device, instead of a device combining the conventional electromagnetic induction ticket gate 20 and the relay ticket gate 10.

Detailed descriptions are hereinafter provided for an operation of the relay ticket gate 10.

Figure 2:
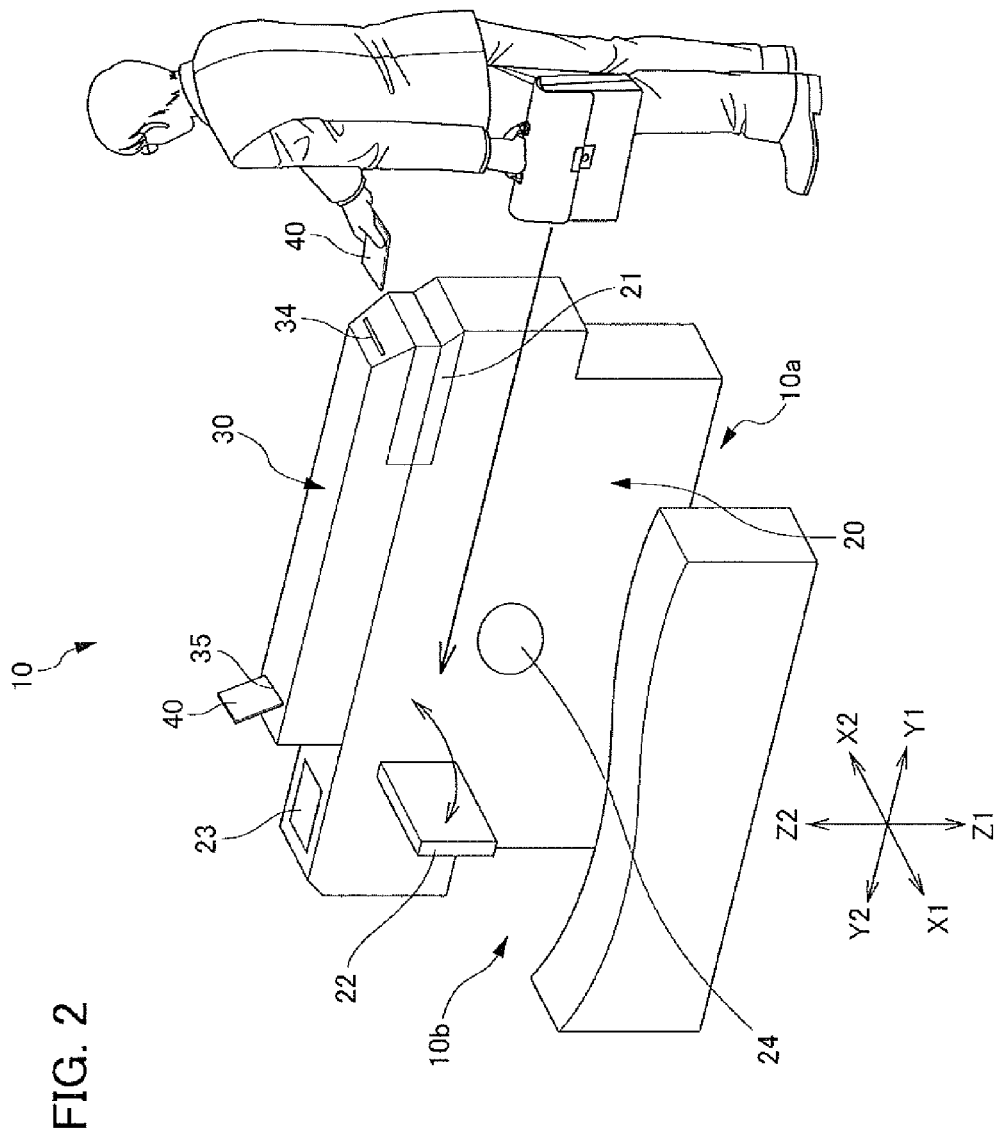
FIG. 2 is a perspective view of a relay ticket gate 10 of the first embodiment.

FIG. 2 is a perspective view of the relay ticket gate 10 of the first embodiment.

FIG. 3 is an exploded perspective view in a vicinity of a reader/writer 2 of the first embodiment, and a cross-sectional view illustrating communication among the electromagnetic induction ticket gate 20, the relay communication device 30 and the IC card 40.

FIG. 3A is an exploded perspective view in the vicinity of the reader/writer 21; and FIG. 3B is a schematic cross-sectional view (cross-sectional view from a direction of an arrow b-b in FIG. 3A) illustrating communication among the electromagnetic induction ticket gate 20, the relay communication device 30 and the IC card 40.

As shown in FIG. 2, in the following descriptions, in a case in which the user moves through the relay ticket gate 10 from an entrance 10a to an exit 10b, a lateral direction of the user is X, and a vertical direction thereof is Z. A travelling direction of the user coincides with a conveyance direction X of the IC card 40. A view from an upper side Z2 of the vertical direction Z is referred to as a plan view as appropriate, and a shape thereof is referred to as a planar shape.

The relay ticket gate 10 is a device provided to each railway station.

The relay ticket gate 10 authenticates a train line section, a period of service, etc. by reading information in the IC card 40 carried by the user, and opens and closes a passage door 22. The relay ticket gate 10 includes the conventional electromagnetic induction ticket gate 20, and the relay communication device 30 mounted in the electromagnetic induction ticket gate 20. In FIG. 2, the user walks from a front side toward a back side of the relay ticket gate 10. In the embodiment, the front side is described as an entrance 10a, and the back side is described as an exit 10b, regardless of entrance and exit of the user.

The electromagnetic induction ticket gate 20 primarily is a device that is similar to the electromagnetic induction ticket gate 3 being capable of transmitting and receiving information to and from the electromagnetic induction IC card 4; however, in the embodiment, the electromagnetic induction ticket gate 20 is capable of transmitting and receiving information to and from the electromagnetic induction IC card 40 via the relay communication device 30.

As shown in FIGS. 2 and 3, the electromagnetic induction ticket gate 20 includes the reader/writer 21, the passage door 22, a monitor 23, and a sound output unit 24.

As shown in FIG. 3, the reader/writer 21 includes a ticket gate loop antenna 21a (a loop antenna on the side of the electromagnetic induction communication device).

For example, the ticket gate loop antenna 21a is a loop antenna of approximately 3 turns, and the size thereof is approximately 40 mm×40 mm. The ticket gate loop antenna 21a is formed by wiring a copper wire on a printed circuit board with a technique such as etching.

As shown in FIG. 2, the passage door 22 is an opening and closing door that is provided to a housing of the electromagnetic induction ticket gate 20. The passage door 22 is driven to be opened and closed by a driving device including a DC motor, etc.

The monitor 23 and the sound output unit 24 are notification units that notify communication processing results.

The monitor 23 is a display unit such as a liquid crystal display. The monitor 23 is disposed on a case surface of the electromagnetic induction ticket gate 20, in a region of the downstream side in the conveyance direction Y. The monitor 23 outputs, for example, characters, etc. to notify a balance, a communication failure, etc. The relay communication device 30 is mounted on the electromagnetic induction ticket gate 20 so as to expose the monitor 23, such that the user can see the monitor 23.

The sound output unit 24 is a speaker that outputs sound. The sound output unit 24 notifies communication failure by outputting, for example, an alarm tone, voice guidance, etc.

As shown in FIGS. 1 to 3, the relay communication device 30 is mounted on the electromagnetic induction ticket gate 20, thereby enabling communication between the electromagnetic induction ticket gate 20 and the IC card 40. The relay communication device 30 includes a relay loop antenna 31, a pair of conductive rails 32L and 32R, a conveyance device 33, an insertion slot 34, and a discharge slot 35.

As shown in FIG. 3, the relay loop antenna 31 communicates (couples) with the ticket gate loop antenna 21a through electromagnetic induction. For example, the relay loop antenna 31 is a loop antenna of approximately 3 turns, and the size thereof is approximately 40 mm×40 mm. The relay loop antenna 31 is formed by wiring a copper wire on a printed circuit board with a technique such as etching.

The conductive rails 32L and 32R are attached to a rail base material 32a formed on an insulating material such as resin, in the shape of rails at an interval of a length L1 of 1 mm, for example. The conductive rails 32L and 32R are arranged in parallel in the conveyance direction Y of the IC card 40. In the present invention, the rail refers to an elongated plate or a rectangular plate in a planar shape, which is laid for the purpose of unidirectionally conveying an information storage medium.

The conductive rails 32L and 32R are formed of a material such as copper foil having conductivity. Each of the conductive rails 32L and 32R is elongated, and has a thickness of 35 μm, a width of 40 mm, and a length of 600 mm. The conductive rails 32L and 32R are electrically connected to both ends of the relay loop antenna 31 through electric wires 32b, respectively.

As described later, when the card is conveyed, the conductive rails 32L and 32R are substantially in close contact with a pair of conductive plates 42L and 42R (to be described later) of the IC card 40 (for example, a top surface of the conductive rails 32L and 32R is separated at a distance L3=approximately 2 mm from an under surface of the conductive plates 42L and 42R), and are disposed to face the conductive plates 42L and 42R, respectively. Therefore, when the card is conveyed, the conductive rails 32L and 32R are electrostatically coupled with the conductive plates 42L and 42R of the IC card 40, respectively.

The conveyance device 33 conveys the IC card 40 on the conductive rails 32L and 32R in the conveyance direction Y. Details of the conveyance device 33 are described later.

As shown in FIG. 2, the insertion slot 34 is an entry, into which the user inserts the IC card 40. An inserted-card feed device 34a and an insertion slot opening-and-closing door 34b are provided to the insertion slot 34 (see FIG. 1).

The inserted-card feed device 34a includes a roller and a motor for rotating the roller, and guides the inserted IC card 40 to the conveyance device 33.

The insertion slot opening-and-closing door 34b includes a door for opening and closing the insertion slot 34, and a motor or the like for driving the door to be opened and closed.

The discharge slot 35 is an exit for discharging the IC card 40 that is conveyed by the conveyance device 33. A discharged-card feed device 35a is provided to the discharge slot 35 (see FIG. 1).

The discharged-card feed device 35a includes a roller and a motor for rotating the roller, and guides the IC card 40 conveyed by the conveyance device 33 to the discharge slot 35.

As shown in FIG. 3, the IC card 40 is a contactless IC card that does not include external contact terminals. The IC card 40 includes an IC chip 41, the pair of conductive plates 42L and 42R (conductive plate members), a lower layer 43, and an upper layer 44.

The IC chip 41 is an integrated circuit capable of communicating through electromagnetic induction, and is similar to an integrated circuit built into the electromagnetic induction IC card 4 (see FIG. 1) including a conventional antenna. The IC chip 41 has a thickness of approximately 150 μm, for example.

The IC chip 41 is disposed so as to straddle the conductive plates 42L and 42R. An I/O unit (lead frame, etc.) of the IC chip 41 is electrically and physically connected to the conductive plates 42L and 42R, respectively, by way of a connection member 46 such as an anisotropic conductive paste, an anisotropic conductive film, or a conductive adhesive. Since the IC chip 41 is of an electromagnetic induction scheme, this I/O unit is primarily connected to the loop antenna. The IC chip 41 has its I/O unit connected to the conductive plates 42L and 42R, and is thereby capable of communicating with the electromagnetic induction ticket gate 20 through the relay communication device 30, as described later.

The conductive plates 42L and 42R are each aluminum foil that is 10 μm thick, and has a short side×long side of 10 mm×50 mm. The conductive plates 42L and 42R are arranged in parallel in a lateral direction (a direction orthogonal to the conveyance direction Y), and are attached to the lower layer 43. An interval L2 between the conductive plates 42L and 42R is, for example, approximately 0.5 mm.

The lower layer 43 is, for example, an insulating film base material such as PET, PET-G, PVC and polyimide having a thickness of 180 μm and short side×long side of 25.0 mm×57.5 mm.

The upper layer 44 is paper, resin, or the like with a thickness of 200 μm. The upper layer 44 is bonded to the lower layer 43 by an adhesive 45 or the like so as to cover the IC chip 41 and the conductive plates 42L and 42R.

Descriptions are provided for communication between the electromagnetic induction ticket gate 20 and the IC card 40 through the relay communication device 30.

Since the ticket gate loop antenna 21a and the relay loop antenna 31 are contactlessly connected to each other through electromagnetic induction, it is possible to transmit and receive information therebetween. The communication scheme of the IC card 40 through electromagnetic induction is standardized by ISO/IEC14443, TSO/IEC 15693 and ISO/IEC 18092, and the signal frequency of 13.56 MHz is used. The communication scheme between the ticket gate loop antenna 21a and the relay loop antenna 31 also conforms to the above.

An example has been described in which the number of turns of the ticket gate loop antenna 21a and the relay loop antenna 31 is on the order of 3; however, the present invention is not limited thereto. It is sufficient that the number of turns allows the two to be contactlessly connected through electromagnetic induction, and the number of turns may be 1 turn or more, for example.

On the other hand, the conductive rails 32L and 32R and the conductive plates 42L and 42R function as capacitor plates, and are contactlessly connected with each other through electrostatic coupling; therefore, information can be transmitted and received therebetween.

In the relay ticket gate 10, an electromotive force is generated in the ticket gate loop antenna 21a by electromagnetic induction of the relay loop antenna 31, whereby the conductive rails 32L and 32R and the conductive plates 42L and 42R are electrostatically coupled with each other, and the driving power is transmitted to the IC chip 41. Data transmitted from the electromagnetic induction ticket gate 20 can be transmitted to the IC chip 41; on the other hand, data returned from the IC chip 41 can be transmitted to the electromagnetic induction ticket gate 20 through the relay communication device 30.

Descriptions are provided for the conveyance device 33.

FIG. 4 is a plan view and a cross-sectional view illustrating the conveyance device 33 of the first embodiment.

Figure 4A:
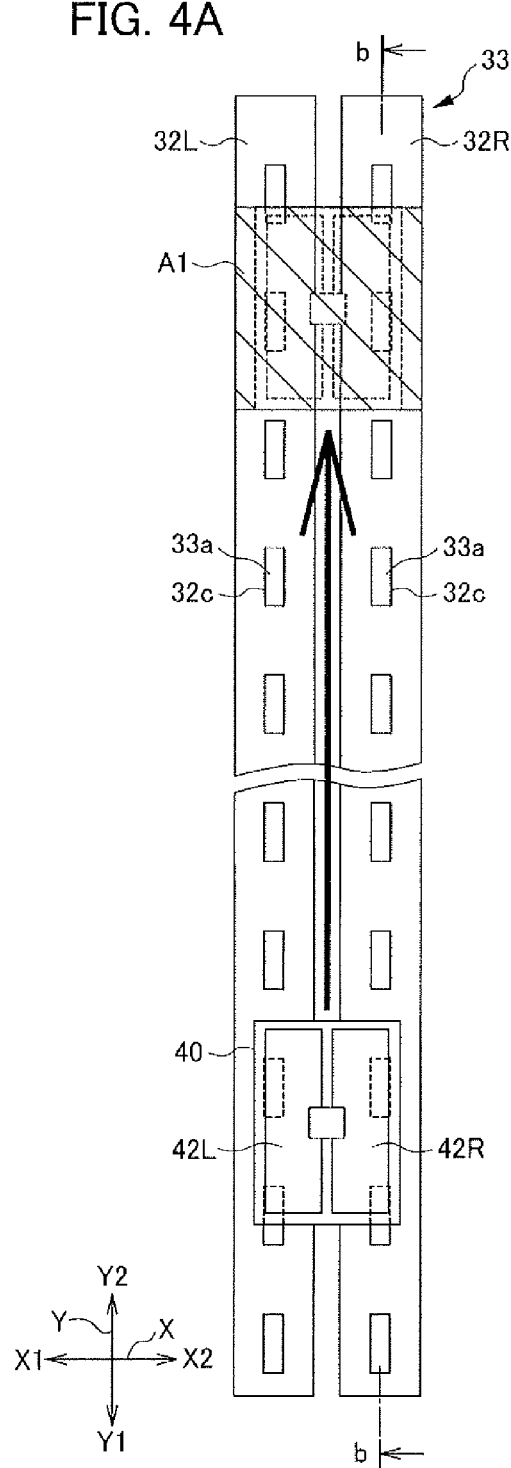
FIG. 4 is a plan view and a cross-sectional view illustrating a conveyance device 33 of the first embodiment.

FIG. 4A is a plan view illustrating lower rollers 33a disposed in the conductive rails 32L and 32R.

Figure 4B:
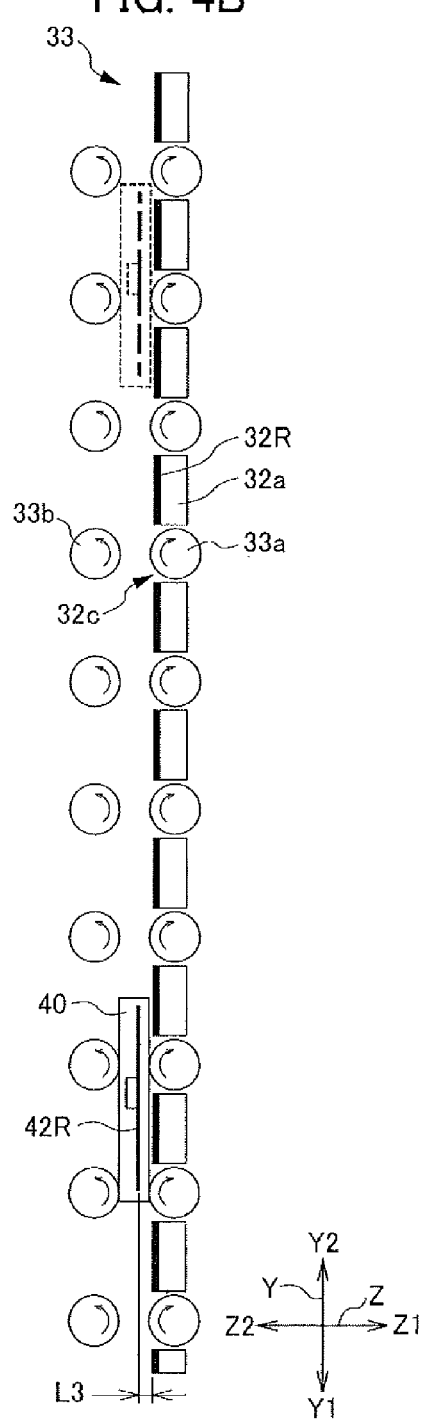

FIG. 4B is a cross-sectional view illustrating the lower rollers 33a and upper rollers 33b (cross-sectional view from a direction of the arrow b-b of FIG. 4A).

The conveyance device 33 includes the plurality of lower rollers 33a and the plurality of upper rollers 33b.

The lower rollers 33a and the upper rollers 33b are formed of an insulating material such as rubber to avoid influence on the electrostatic coupling. The lower rollers 33a and the upper rollers 33b are disposed such that the rotation axis thereof is in the lateral direction X.

The lower rollers 33a are disposed in openings 32c provided in portions of the conductive rails 32L and 32R, and are arranged along the conveyance direction Y of the IC card 40. The openings 32c are slightly larger than the planar shape of the lower rollers 33a such that the lower rollers 33a are rotatable. Each of the lower rollers 33a is disposed such that a part of the outer periphery thereof protrudes from the surface of the conductive rails 32L and 32R. The protrusion amount of the lower lowers 33a is set such that the distance L3 is, for example, approximately 2 mm, as described above. A DC motor or the like (not shown) rotationally drives the lower rollers 33a in a direction toward the downstream side Y2 in the conveyance direction Y (clockwise rotation shown in FIG. 4B).

In the plan view, each upper roller 33b is disposed in a position corresponding to a respective lower roller 33a, and is disposed to provide a certain clearance in the vertical direction Z so as to allow the IC card 40 to be interposed between the upper rollers 33b and the lower rollers 33a. Each of the upper rollers 33b is rotatably supported within the relay communication device 30.

The conveyance device 33 conveys the IC card 40, such that the longitudinal direction of the IC card 40 is in the conveyance direction Y, and card surfaces face the vertical direction. As a result, the conductive plates 42L and 42R are arranged in parallel in the lateral direction X (the direction orthogonal to the conveyance direction Y), and the long side direction of the conductive plates 42L and 42R coincides with the conveyance direction Y of the IC card 40.

As a result, in the conveyance device 33, from the upstream side Y1 to the downstream side Y2 on the conductive rails 32L and 32R, the conductive plates 42L and 42R consistently face the conductive rails 32L and 32R. Therefore, the relay ticket gate 10 can execute communication processing while conveying the IC card 40.

As described later, the range of the downstream side Y2 on the conductive rails 32L and 32R is a suspension range A1 (communication result determination range), in which the IC card 40 being conveyed by the conveyance device 33 is suspended for the purpose of determining a communication result.

FIG. 5 is a plan view illustrating an area in which the conductive rails face the conductive plates.

FIG. 5A is a plan view illustrating a manner of disposing the lower rollers 33a of the embodiment.

FIG. 5B shows an example, in which lower rollers 33a-2 are arranged along a central line between conductive rails 32L-2 and 32R-2, and the interval between the conductive rails 32L-2 and 32R-2 is widened.

FIG. 5C shows an example, in which lower rollers 33a-3 are disposed outside conductive rails 32L-3 and 32R-3, and the width of the conductive rails 32L and 32R is narrowed.

In the cases shown in FIGS. 5B and 5C, the areas in which the conductive rails 32L and 32R face the conductive plates 42L and 42R are smaller than the area shown in FIG. 5A of the embodiment.

In other words, by arranging the lower rollers 33a in the openings 32c that are provided in the portions of the conductive rails 32L and 32R as shown in FIG. 5A, it is possible to decrease the reduction of the surface area of the conductive rails 32L and 32R. As a result, in the conveyance device 33, it is possible to widen the area in which the conductive rails 32L and 32R face the conductive plates 42L and 42R, and the communication stability can be improved.

With reference to FIG. 1, descriptions are provided for a block diagram of the relay ticket gate 10 and the IC card 40.

The electromagnetic induction ticket gate 20 includes a ticket gate storage unit 26 and a ticket gate control unit 27 (a communication result determination control unit).

The ticket gate storage unit 26 is a storage device such as semiconductor memory elements for storing programs, information, etc. required for operating the electromagnetic induction ticket gate 20.

The ticket gate control unit 27 is a control unit for centrally controlling the electromagnetic induction ticket gate 20, and is configured by a CPU, for example. By appropriately reading and executing various programs stored in the ticket gate storage unit 26, the ticket gate control unit 27 collaborates with the hardware described above, and implements various functions according to the present invention.

Since the electromagnetic induction ticket gate 20 is similar in configuration to the electromagnetic induction ticket gate 3, a basic configuration of the ticket gate storage unit 26 and the ticket gate control unit 27 is similar to the basic configuration of the storage unit and the control unit (not shown) provided to the electromagnetic induction ticket gate 3.

The relay communication device 30 includes a relay storage unit 36 and a relay control unit 37.

The relay storage unit 36 is a storage device such as semiconductor memory elements for storing programs, information, etc. required for operating the relay communication device 30.

The relay control unit 37 is a control unit for centrally controlling the relay communication device 30, and is configured by a CPU, for example. By appropriately reading and executing various programs stored in the ticket gate storage unit 26, the relay control unit 37 collaborates with the hardware described above, and implements various functions according to the present invention.

The relay control unit 37 is electrically connected to the electromagnetic induction ticket gate 20, and can confirm a result, determination and a situation of the communication between the electromagnetic induction ticket gate 20 and the IC card 40.

The IC chip 41 of the IC card 40 includes an IC chip storage unit 41a, an IC chip control unit 41b, and an analog circuit unit 41c.

The IC chip storage unit 41a is a memory circuit for storing programs, information, etc. required for operating the IC card 40. The IC chip storage unit 41a rewritably stores information such as a train line section, a period of service, the user's name, etc. for example.

The IC chip control unit 41b is a control unit for centrally controlling the IC card 40, and is configured by a CPU or the like, for example. By appropriately reading and executing various programs stored in the IC chip storage unit 41a, the IC chip control unit 41b implements various functions according to the present invention.

The analog circuit unit 41c is configured by a rectifier circuit, a modulation circuit, a demodulation circuit, and a CLK extraction circuit; executes AD conversion and clock generation from a signal that is input through IC chip input-output terminals; supplies voltage power and clock to the IC chip control unit 41b; and inputs and outputs data to and from the IC chip control unit 41b.

Next, descriptions are provided for an operation of the relay ticket gate 10 of the embodiment.

Figure 6:
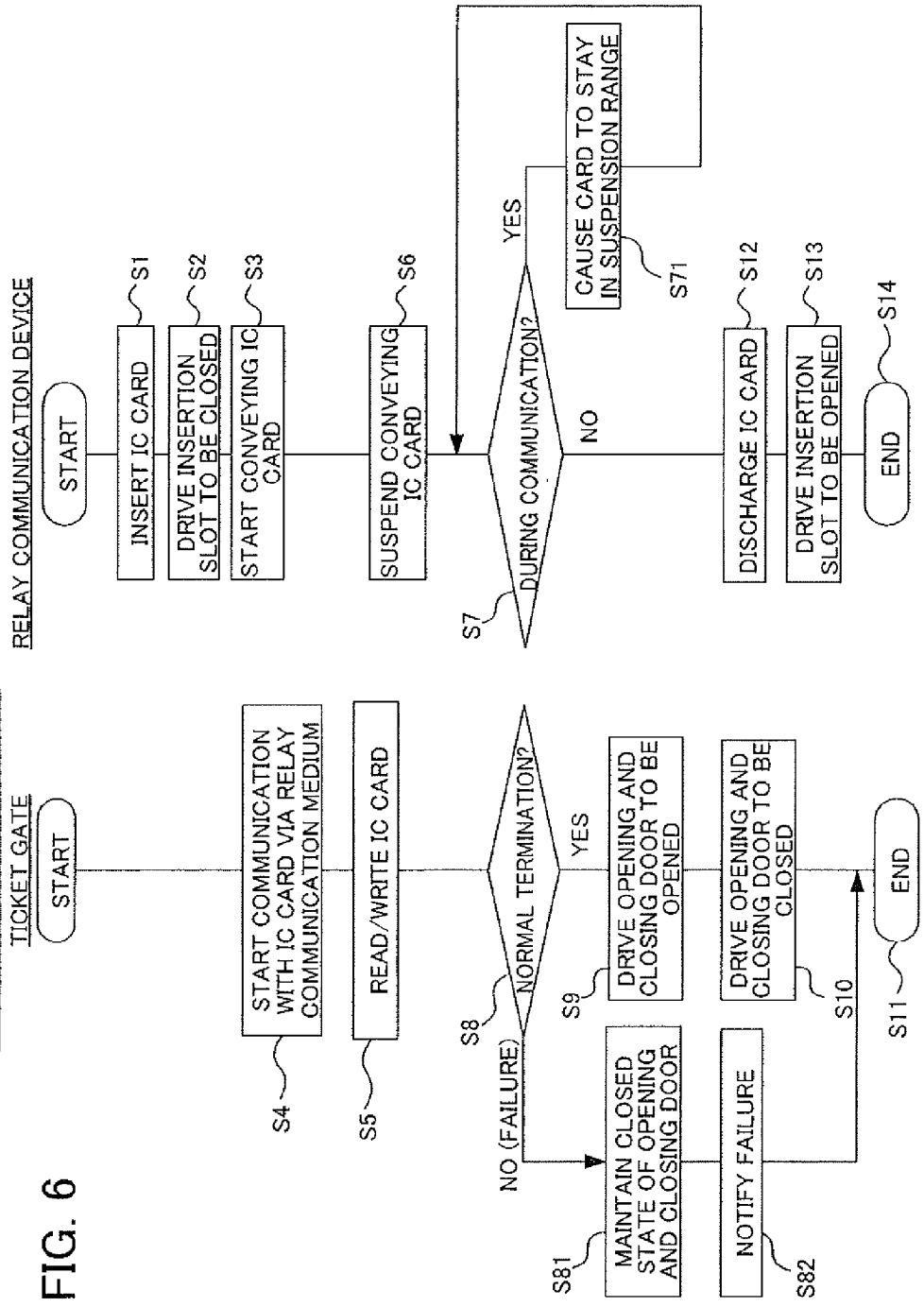
FIG. 6 is a flowchart of an operation of the relay ticket gate 10 of the first embodiment.

FIG. 6 is a flowchart of the operation of the relay ticket gate 10 of the first embodiment.

IC Card Insertion Processing

As shown in FIGS. 1 and 2, in Step S1, when the user inserts the IC card 40 into the insertion slot 34 at the entrance 10a, a detection unit (not shown) such as an optical sensor of the insertion slot 34 detects the inserted IC card 40, and outputs detected information to the relay control unit 37. In response to the output from the detection unit, the relay control unit 37 drives the inserted-card feed device 34a, and guides the inserted IC card 40 to the conveyance device 33.

In Step S2, based on the output from the detection unit of the insertion slot 34, the relay control unit 37 drives the insertion slot opening-and-closing door 34b to be closed, such that another IC card 40 cannot be inserted from the insertion slot 34. The purpose of driving the insertion slot opening-and-closing door 34b to be closed is that, if another IC card 40 is inserted during the communication processing of the IC card 40, it becomes difficult to discriminate which IC card 40 the reader/writer 21 is communicating with, which may result in failure occurring in the communication processing.

The user continues walking from the entrance 10a toward the exit 10b.

Card Conveyance Processing

In Step S3, when the detection unit (not shown) such as an optical sensor provided upstream of the conductive rails 32L and 32R detects the IC card 40 guided by the inserted-card feed device 34a, the detection unit outputs the detected information to the relay control unit 37. Based on the output from the detection unit, the relay control unit 37 drives the conveyance device 33 to start conveying the IC card 40.

Communication Processing

In Step S4, while the IC card 40 is conveyed on the conductive rails 32L and 32R in the conveyance direction Y, the ticket gate loop antenna 21a is connected to the relay loop antenna 31 through electromagnetic induction, and the conductive rails 32L and 32R are electrostatically coupled with the conductive plates 42L and 42R of the IC card 40.

As a result, the ticket gate control unit 27 starts transmitting and receiving information to and from the IC chip 41 of the IC card 40 that is traveling on the conductive rails 32L and 32R.

In Step S5, as communication processing, the ticket gate control unit 27 starts writing and reading information of the IC chip 41. For example, the ticket gate control unit 27 reads the information of the IC chip 41, authenticates whether the train line section or the like is proper, and writes information about the entrance and exit of the user at the ticket gate, into the IC chip 41.

Conveyance Suspension Processing

In Step S6, when the IC card 40 is conveyed to a suspension range A1 (see FIG. 4) in the downstream side Y2 of the conductive rails 32L and 32R, the detection unit such as an optical sensor disposed in the suspension range A1 detects the conveyed IC card 40, and outputs detected information to the relay control unit 37. Based on the output from the detection unit, the relay control unit 37 drives the conveyance device 33 to be suspended, and causes the IC card 40 to stay in the suspension range A1.

Communication Termination Determination Processing

In Step S7, based on a content of monitoring transmission and reception between the ticket gate control unit 27 and the IC chip 41, the relay control unit 37 determines whether communication is currently performed between the ticket gate control unit 27 and the IC chip 41. In a case in which the relay control unit 37 determines that communication is currently performed between the ticket gate control unit 27 and the IC chip 41 (YES in Step S7), the processing advances to Step S71; on the other hand, in a case in which the relay control unit 37 determines that the communication is terminated (NO in Step S7), the processing advances to Step S12.

In Step S71, the relay control unit 37 maintains a state where the IC card 40 stays in the suspension range A1 and, and repeats the processing from S7. As a result, the relay control unit 37 causes the IC card 40 to stay in the suspension range A1 until the communication is terminated (NO in Step S7).

As a result, the relay control unit 37 does not have to cause the communication processing time to coincide with the conveyance speed; therefore, the conveyance device 33 can be easily controlled.

The relay automatic ticket gate system 1 can reduce the failure occurrence resulting from communication processing delay. Reasons thereof are described as follows.

For example, even if the conveyance speed is set such that "the period of time required for conveyance is longer than the period of time required for communication (without retrial)", in a case in which the retrial processing is executed due to a communication failure, "the period of time required for conveyance is shorter than the period of time required for communication (including retrial)"; therefore, the communication processing may not be completed when the conveyance is completed, which may be determined as a communication failure. In contrast, since the relay control unit 37 maintains the state where the IC card 40 stays in the suspension range A1 until the communication is terminated, the relay automatic ticket gate system 1 can reduce the failure resulting from communication processing delay due to retrial, etc.

In Step S8, based on the content of transmission and reception with the IC chip 41, the ticket gate control unit 27 determines whether the information of the train line section or the like is proper, i.e. whether the communication processing result is normal.

In a case in which the ticket gate control unit 27 determines that the communication processing result is normal (YES in Step S8), the processing advances to Step S9; on the other hand, in a case in which the ticket gate control unit 27 determines that the communication processing result is abnormal (NO in Step S8), the processing advances to Step S81.

Passage Door Opening and Closing Processing

In Step S9, the ticket gate control unit 27 drives the passage door 22 to open.

In Step S10, when the detection unit such as an optical sensor detects the user passing through the ticket gate toward the exit 10b, the ticket gate control unit 27 drives the passage door 22 to be closed based on the output from the detection unit, or drives the passage door 22 to be closed after a certain period of time has elapsed, terminates the processing at the electromagnetic induction ticket gate 20 side, and starts accepting the next IC card 40 (Step S11).

Failure Notification Processing

In Step the S81, the ticket gate control unit 27 maintains a state where the passage door 22 is closed, and in Step S82, the sound output unit 24 outputs an alarm tone, the display unit displays that the IC card 40 is improper, and the user is notified of the communication processing result being failure. The processing at the electromagnetic induction ticket gate 20 side is then terminated, and the processing starts accepting the next IC card 40 (Step S11).

Card Discharge Processing

In Step S12, the relay control unit 37 drives a discharge conveyance mechanism to discharge the IC card 40, which was conveyed to the suspension range A1, from the discharge slot 35.

An accommodation device for accommodating the IC card 40 may be provided at the exit, for a case in which the IC card 40 is a ticket such as a single use ticket. In this case, the relay control unit 37 (the communication result determination control unit) may determine whether the communication between the ticket gate control unit 27 and the IC chip 41 is normally terminated, based on the content of monitoring transmission and reception between the ticket gate control unit 27 and the IC chip 41. In a case in which the relay control unit 37 determines that the communication is normally terminated, the relay control unit 37 may control the accommodation device to accommodate the IC card 40 in a container; on the other hand, in a case in which the relay control unit 37 determines that communication failure occurs, the relay control unit 37 may discharge the IC card 40.

Insertion Slot Opening Driving Processing

In Step S13, when the detection unit (not shown) such as an optical sensor provided to the discharge slot 35 detects the user pulling out the IC card 40 discharged from the discharge slot 35, the detection unit outputs the detected information to the relay control unit 37. Based on the output from the detection unit, the relay control unit 37 drives the insertion slot opening-and-closing door 34b to open, terminates the processing in the relay communication device 30, and starts accepting the next IC card 40 (Step S14).

As a result, it is possible to prevent another IC card 40 from being inserted into the insertion slot 34, until the communication processing of the IC card 40 is normally terminated to drive the insertion slot opening-and-closing door 34b of the passage door 22 to be completely opened (Step S10), or until restoration processing is completed in a case in which communication processing failure occurs.

By the above processing, in a case in which the communication result is normal (YES in Step S8), the user can pull out the IC card 40 discharged from the discharge slot 35 (Step S12), and can pass the relay ticket gate 10 from the exit 10*b*, through the passage door 22 that is driven to be opened.

On the other hand, in a case in which the communication result is failure (NO in Step S8), the user cannot pass the relay ticket gate 10 since the passage door 22 is maintained in a closed position (Step S81), then the user returns to the entrance 10*a* to pull out the IC card 40 discharged from discharge slot 35 (Step S12), and inserts the IC card 40 into the insertion slot 34 again to recognize that the IC card 40 is improper, then can adjust the fare or like.

Since the conductive rails 32L and 32R are provided as rails, it is possible to maintain a state where the conductive rails 32L and 32R face in proximity to the conductive plates 42L and 42R of the IC card 40, when the IC card 40 is conveyed. As a result, a period of time of the user walking through the relay ticket gate 10 can be utilized for the communication processing while conveying the IC card 40; therefore, the gate access processing time, etc. can be shortened.

For example, with the conventional electromagnetic induction communication system, communication is possible even if the IC card 4 and the reader/writer are measurably separated at a distance of several tens of millimeters; therefore, communication is enabled from a stage of approximating the IC card 4 to the reader/writer.

In contrast, with the electrostatic coupling communication system, the communication distance between the IC card 40 and the reader/writer 21 is on the order of 2 mm as described above, which is shorter than the communication distance in the electromagnetic induction communication system. Therefore, communication is not initiated unless the IC card 40 is substantially in close contact with the reader/writer 21. Therefore, even if the communication time between the IC card 40 and the reader/writer 21 is equal to the communication time of the electromagnetic induction communication system, the user actually feels the processing time as being longer by a period of time required for approximating the IC card 40 to the reader/writer at a distance on the order of 2 mm.

As described above, with the relay ticket gate 10 of the embodiment, the period of time of the user walking from the entrance 10*a* to the exit 10*b* is utilized for the communication processing of the IC card 40, thereby shortening the processing time that is actually felt by the user. As a result, even if the electrostatic coupling scheme is utilized, the relay ticket gate 10 can suppress the congestion when users pass therethrough.

For example, the conventional electromagnetic induction communication system having a conveyance device requires three seconds in total, including "two seconds for conveyance" as a period of time for conveying an IC card to an area where communication is enabled, and "one second for executing communication processing" after stopping the communication. In contrast, since the relay ticket gate 10 of the embodiment executes the communication processing while conveying the IC card 40, the communication processing is completed in "two seconds for conveyance". Therefore, the processing time can be shortened by one second as compared to the conventional processing time.

As described above, the relay automatic ticket gate system 1 can transmit signals through electromagnetic induction of the ticket gate loop antenna 21*a* and the relay loop antenna 31, and can transmit signals through electrostatic coupling of the conductive rails 32L and 32R of the relay communication device 30 and the conductive plates 42L and 42R of the IC card 40, which face each other.

With the relay automatic ticket gate system 1, a loop antenna is not required to be formed in the IC card 40, but the two conductive plates 42L and 42R may be provided to the IC card 40; therefore, the conventional antenna forming process such as complicated etching is not required, and the IC card 40 can manufactured at low cost. Accordingly, as the number of issuing the IC cards 40 is increased, the cost advantage is enhanced, and the system can be constructed at lower cost.

The relay automatic ticket gate system 1 uses the server 2 and the electromagnetic induction ticket gate 3 of the electromagnetic induction system, which are mass-marketed; therefore, the whole system can be easily constructed at low cost by adding the relay ticket gate 10 to an existing electromagnetic induction system.

Even in a case in which a new system is introduced, the IC chip 41 used for the electromagnetic induction IC card 40 can be diverted, and the existing reader/writer 21 for contactless IC can be diverted. As a result, the system can be constructed without the need to develop the special IC chip 41 for electrostatic coupling and the electromagnetic induction ticket gate 20.

Second Embodiment

Next, descriptions are provided for a second embodiment of the present invention.

In the following descriptions and drawings, the same symbols or the same ending symbols are assigned to portions carrying out functions similar to the first embodiment described above, and redundant descriptions are omitted as appropriate.

Figure 7:
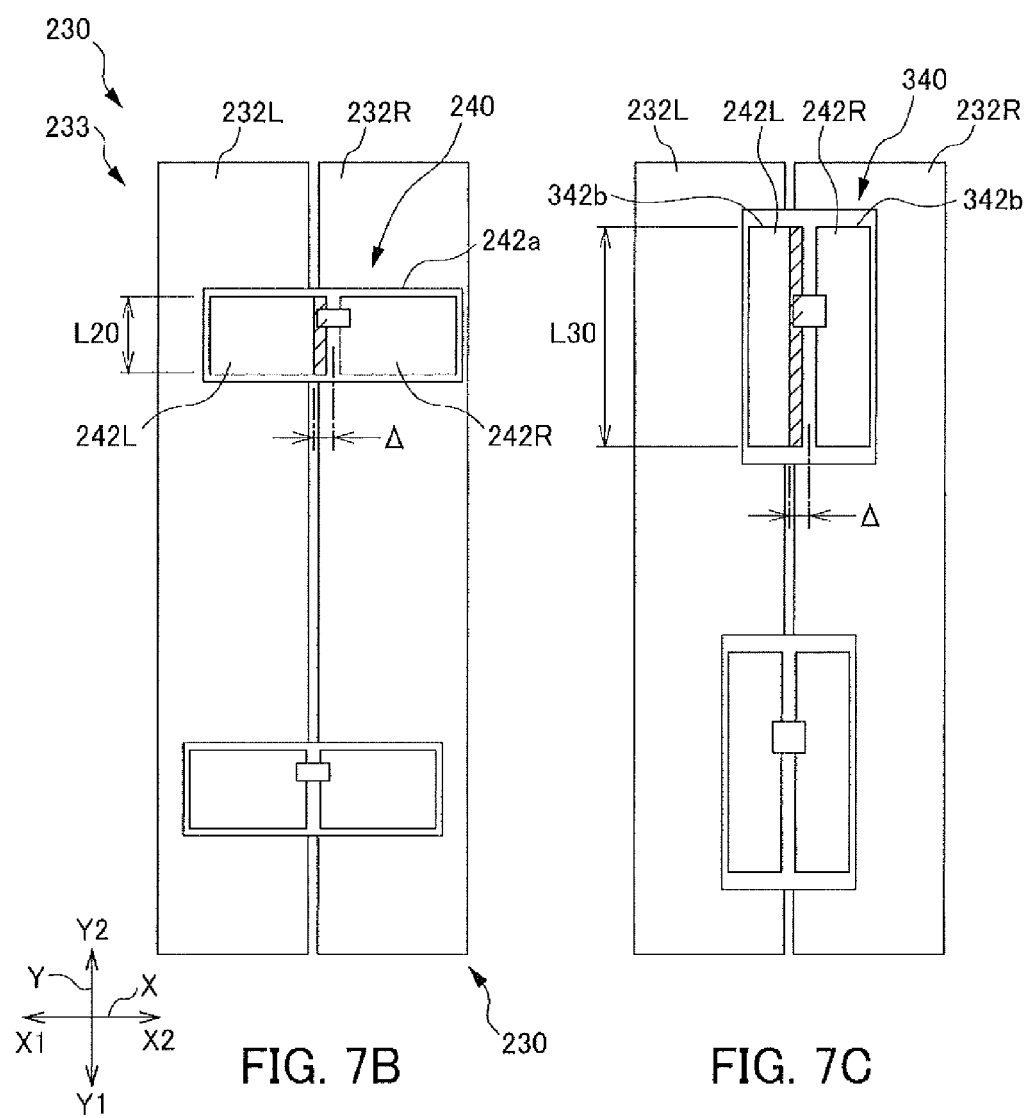
FIG. 7 is a plan view of an IC card 240 of a second embodiment, and a plan view illustrating deviation of the IC card 240.

FIG. 7 is a plan view of an IC card 240 of the second embodiment, and a plan view illustrating deviation of the IC card 240.

As shown in FIG. 7A, the conductive plates 242L and 242R of the IC card 240 are arranged in parallel in a longitudinal direction of the IC card 240.

For example, an external shape of the IC card 240 has long side×short side of 57.5 mm×25 mm, and an external shape of the conductive plates 242L and 242R has long side×short side of 25 mm×20 mm.

As shown in FIG. 7B, a conveyance device 233 of a relay communication device 230 conveys the IC card 240, such that the conveyance direction Y is orthogonal to a long side 242*a* of the conductive plates 242L and 242R.

As a result, even if the IC card 240 deviates in the lateral direction X (a direction orthogonal to the conveyance direction Y (long side direction)), it is possible to decrease the reduction of an area in which the conductive plates 242L and 242R of the IC card 240 face the conductive rails 232L and 232R of the relay communication device 230; therefore, the tolerance of positional deviation can be improved, and the communication stability can be improved.

Descriptions are provided for decreasing the reduction of the area due to deviation.

FIG. 7C shows an IC card 340, in which conductive plates 342L and 342R are elongated in the longitudinal direction of the IC card 340, and are arranged in parallel in a direction of a short side 342*b* of the IC card 340. An area of the IC card 240 is equal in a planar shape to an area of the IC card 340. Therefore, a length of each conductive plate in the conveyance direction Y is "L2<L30".

For example, as shown in FIGS. 7B and 7C, discussion is provided for a case in which the IC card 240 and the IC card 340 are deviated by a length Δ in the lateral direction X. An area in which the conductive plates 242L and 242R face the conductive rails is reduced by "Δ×L20" in the IC card 240, whereas the area is reduced by "Δ×L30" in the IC card 340. Since "L20<30", an equation "Δ×L20<Δ×L30" holds.

In this manner, in the case of the IC card 240, the area reduction due to deviation is smaller, and the communication stability can be improved, as compared to the case of the IC card 340.

In cases in which the IC card 240 and/or the IC card 340 deviate in the conveyance direction Y, the area is not reduced, and the equivalent communication stability can be maintained.

Figure 8:
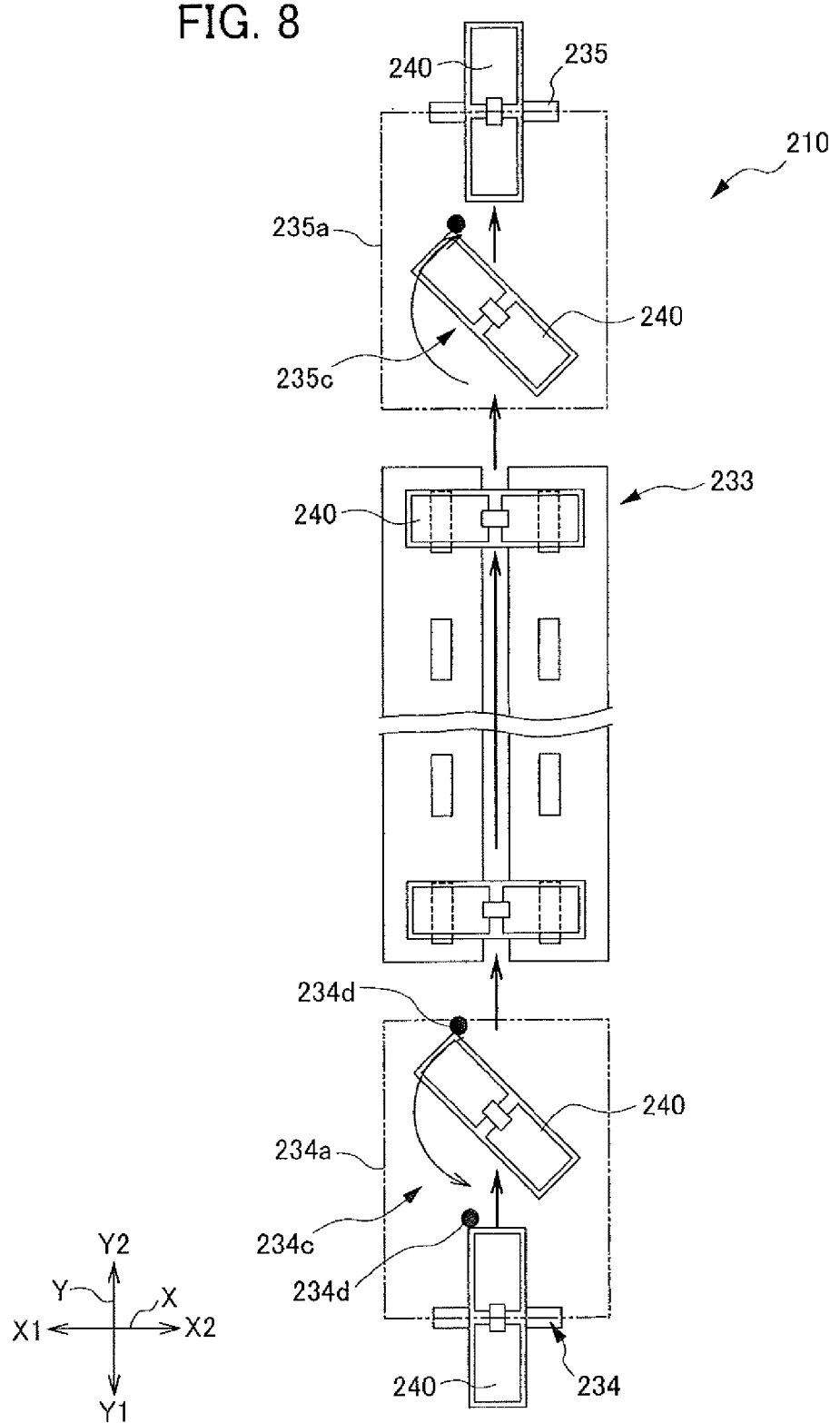
FIG. 8 is a schematic plan view showing a conveyance device 233, an insertion slot 234, and a discharge slot 235, of the second embodiment.

FIG. 8 is a schematic plan view showing the conveyance device 233, an insertion slot 234, and a discharge slot 235, of the second embodiment.

IC card alignment devices 234c and 235c are included inside the insertion slot 234 and the discharge slot 235, respectively.

In a case in which the IC card 240 is inserted into the insertion slot 234 such that the longitudinal direction coincides with the conveyance direction Y, the IC card alignment device 234c of the insertion slot 234 rotates and aligns the IC card 240 while the inserted-card feed device 234a guides the IC card 240 to the conveyance device 233, such that the longitudinal direction of the IC card 240 (i.e. a direction of aligning the pair of conductive plates 242L and 242R) coincides with the lateral direction X (the direction orthogonal to the conveyance direction Y). The IC card alignment device 234c includes protrusions 234d, and aligns the IC card 240 by driving the protrusions 234d that protrude and retreat. The configuration of the IC card alignment device 234c is not limited thereto, and other publicly known techniques for rotating a conveyed card can be employed.

With the above configuration, the relay ticket gate 210 can guide the IC card 240 to the conveyance device 233 such that the conductive rails 232L and 232R are disposed to face the conductive plates 242L and 242R, and even if the IC card 240 is longitudinally elongated, the IC card 240 can be easily inserted into the insertion slot 234.

In a case in which the conveyance device 233 conveys the IC card 240 in a state where the longitudinal direction of the IC card 240 coincides with the lateral direction X, the IC card alignment device 235c of the discharge slot 235 rotates and aligns the IC card 240 such that the longitudinal direction coincides with the conveyance direction Y, while the discharged-card feed device 235a guides the IC card 240 to the discharge slot 235. A configuration of the IC card alignment device 235c is similar to the configuration of the IC card alignment device 234c.

Even in a case in which the device is designed to insert the IC card 240 into the insertion slot 234 such that the longitudinal direction coincides with the lateral direction X, the user may insert the IC card 240 rotated to some extent. Even in such a case, by providing a device similar to the IC card alignment device 234c, the IC card 240 can be aligned, and the communication stability can be improved. The IC card alignment devices 234c and 235c as described above may be provided to the relay ticket gate 10 of the first embodiment.

As described above, with the relay ticket gate 210 of the present embodiment, even if the IC card 240 is longitudinally elongated, the IC card 240 can be easily inserted into the insertion slot 234 and easily pulled out from the discharge slot 235, and the operability can be improved.

Third Embodiment

Descriptions are hereinafter provided for a third embodiment of the present invention with reference to the drawings, etc.

In the following descriptions and drawings, a direction normal to a card surface and a conductive member surface is referred to as a vertical direction Z, a diagram viewed from the vertical direction Z is referred to as a plan view as appropriate, and a shape of the plan view is referred to as a planar shape as appropriate.

Regarding the coordinate system of the conveyance device, a direction of conveying the IC card is the conveyance direction Y, and a direction orthogonal to the conveyance direction Y in a plan view is the lateral direction X. Regarding the coordinate system of the IC card, a direction of arranging a plurality of IC cards at the time of manufacturing (medium arrangement direction) is a longitudinal direction B, and a direction orthogonal to the longitudinal direction B in a plan view is a transverse direction A.

As in an embodiment to be described later, conductive members 332A and 332B are attached to a belt 361, and move in synchronization with the IC card 340 along the downstream side Y2 in the conveyance direction Y (card conveyance direction).

Method of Manufacturing IC Card 340

Next, descriptions are provided for a method of manufacturing the IC card 340 of the third embodiment.

Figure 9:
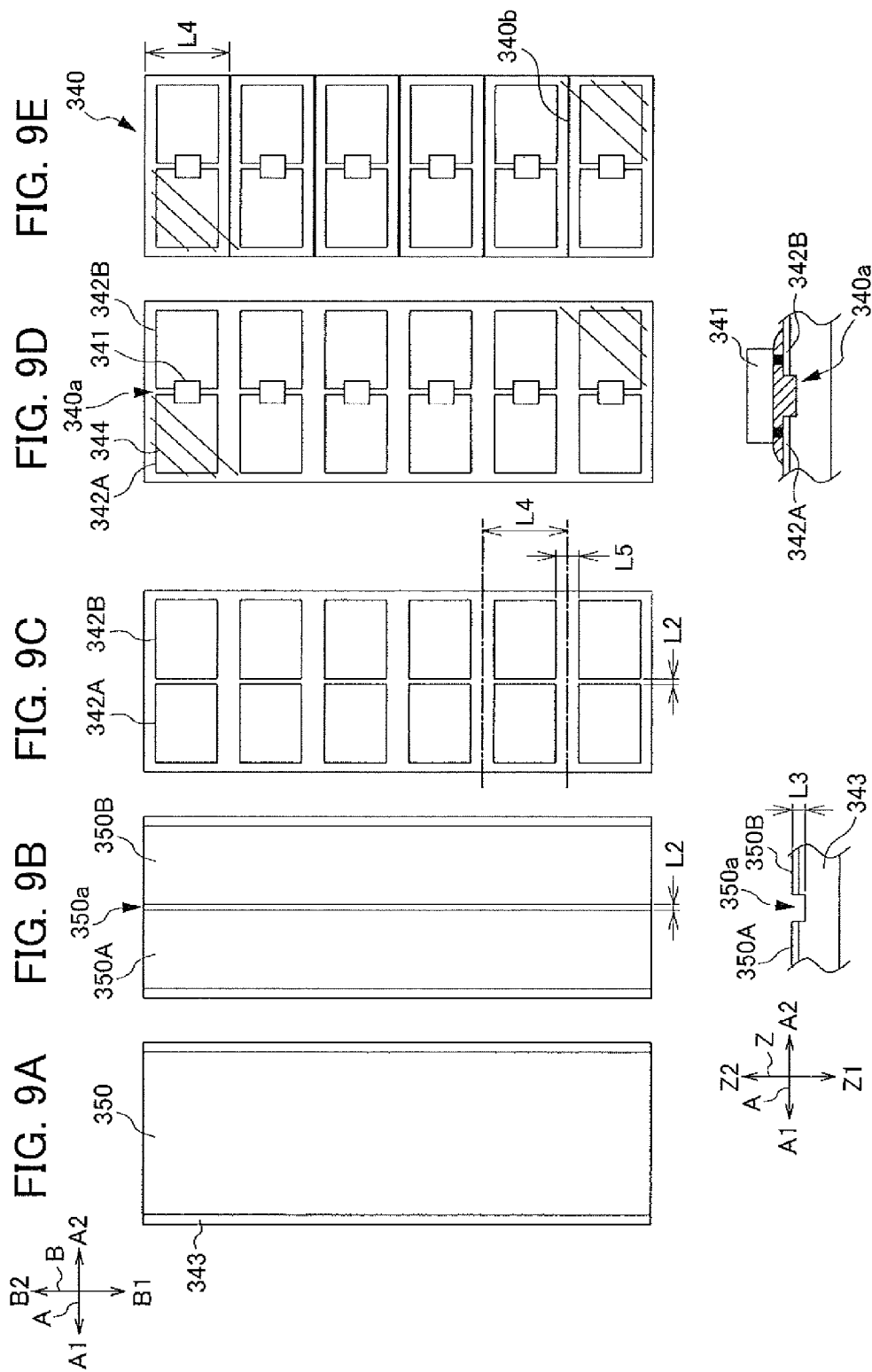
FIG. 9 is a plan view illustrating a method of manufacturing an IC card 340 of a third embodiment.

FIG. 9 is a plan view illustrating the method of manufacturing the IC card 340 of the third embodiment.

A direction of arranging conductive plates 342A and 342B is a transverse direction A (a direction orthogonal to the medium arrangement direction).

The method of manufacturing the IC card 340 follows the following steps.

(1) Conductive Thin Plate Forming Step

A conductive thin plate 350 is attached on a lower layer 343. The conductive thin plate 350 is a plate material that is processed into the conductive plates 342A and 342B. A length of the conductive thin plate 350 in the transverse direction A is shorter than the lower layer 343, and a planar shape of the conductive thin plate 350 is elongated in the longitudinal B.

(2) Conductive Thin Plate Cutting Step (Conductive Thin Plate Removing Step, and Conductive Plate Forming Step)

In the conductive thin plate cutting step, a removal area as a portion of the conductive thin plate 350 is removed by cutting or half-cut-off, the conductive plates 342A and 342B of the IC card 340 are separated from each other, and the conductive plates 342A and 342B between the adjacent IC cards 340 are separated from each other. As a result, a plurality of combinations of the electrically independent conductive plates 342A and 342B can be formed on the lower layer 343.

In the embodiment, even in a state where a plurality of combinations of pairs of conductive plates are formed before cutting into pieces of individual IC cards, and the combination of conductive plates adjacent in the arrangement direction is connected by the lower layer, etc. (base material), such an IC card is referred to as an IC card as appropriate.

The conductive thin plate cutting step includes a longitudinal cutting step (medium arrangement direction removing step), and a lateral cutting step (orthogonal removing step).

(2-1) Longitudinal Cutting Step

As shown in FIG. 9B, a removal area along a longitudinal direction B is removed by cutting work by using a milling cutter, etc. As a result, the conductive thin plate 350 is divided into two conductive plates 350A and 350B, and an elongated slit 350a is formed in the longitudinal direction B.

The cutting method is implemented by techniques such as scanning with a cutting blade along the longitudinal direction B, or moving the lower layer 343 in the longitudinal direction B in a state where the cutting blade is fixed.

A width of the slit 350a is equal to the length L2 of the slit 340a of the IC card 340, and is approximately 0.5 mm.

As shown in a cross-sectional view of FIG. 9B, a cutting depth L3 is made deeper than the surface of the lower layer 343 to prevent the slit 350a from partly remaining uncut.

The cutting work may employ cutting work with a circular blade, cutting work with a V-shaped gouge, a U-shaped gouge, a flat U-shaped gouge, etc., or half-cut-off working with a metal mold.

(2-2) Lateral Cutting Step

As shown in FIG. 9C, the removal area between adjacent IC cards 340, i.e. between a combination pair of the conductive plates 342A and 342B, is removed by cutting. The cutting method is similar to the longitudinal cutting step, and the scanning may be performed a plurality of times in the transverse direction A for each scanning interval L4.

The scanning interval L4 in the longitudinal direction B is equal to the length of the short side of the IC card 340. A scanning width L5 in the lateral cutting step is approximately 2 mm that is larger than the scanning width L2 in the longitudinal cutting step. The purpose of making the scanning width L5 wide in the lateral cutting step is to prevent the conductive plates 342A and 342B from being exposed from a card end (cutting plane) by sufficiently considering the processing error, in a cutting-into-piece step to be described later.

A plurality of combinations of the conductive plates 342A and 342B can be made by executing the longitudinal cutting step and the lateral cutting step. The sequence of the longitudinal cutting step and the lateral cutting step may be transposed.

The above steps may be executed in the following manner.

Instead of cutting the conductive thin plate 350, the removal area may be removed by etching. Mask patterns utilized for etching are characterized in fine formability. Therefore, in this case, the width of the slit 340a can be narrowed, and even a small IC chip 341 can be mounted.

Instead of attaching the conductive thin plate 350 on the lower layer 343, a conductive layer may be laminated as a thin plate on the lower layer 343 by electroplating to provide a layer corresponding to the conductive thin plate 350. In this case, in addition to the above effect, the conductive layer can be thinned, and thus can be formed at low cost. If masking is applied to an area corresponding to the slit 350a and the removal area between the combination of the conductive plates 342A and 342B, the conductive thin plate cutting step is not needed, and the number of steps can be reduced.

Similarly, conductive ink may be printed on the lower layer 343 to provide a layer corresponding to the conductive thin plate 350. In this case as well, the conductive layer can be thinned, and thus can be formed with a less expensive manufacturing technique. If the printing is not applied to the area corresponding to the slit 350a and the removal area between the combination of the conductive plates 342A and 342B, the conductive thin plate cutting step is not needed, and the number of steps can be reduced.

The conductive plates 342A and 342B, instead of being formed by cutting after laminating on the lower layer 343, may be disposed on the lower layer 343 previously cut into pieces. In this case, the conductive plates 342A and 342B are laminated on the lower layer 343 to become a state shown in FIG. 9C, and the steps can be simplified.

(3) IC Chip Disposing Step

As shown in FIG. 9D, the IC chip 341 is disposed to each combination of the conductive plates 342A and 342B, so as to straddle the slit 340a.

Bump processing such as gold plating is applied in advance to antenna connection terminals of the IC chip 341. The antenna connection terminals and the conductive plates 342A and 342B are disposed to face each other, and are connected to each other through an anisotropic conductive film, an anisotropic conductive paste, an insulative paste, etc.

A mark indicating a position of mounting the IC chip 341 may be provided by printing or the like on a surface of the lower layer 343 for mounting the IC chip 341. The purpose of providing the mark is to facilitate and equalize the work of mounting the IC chip 341.

(4) Upper Layer Disposing Step

As shown in FIG. 9D, an upper layer 344 is laminated (see FIG. 3B).

In the upper layer disposing step, the upper layer 344 is attached to the upper side Z2 of the lower layer 343, the IC chip 341, and the conductive plates 342A and 342B, with an adhesive 45 (see FIG. 3B). By laminating the upper layer 344, the IC chip 341 can be covered and reinforced, and a surface of the upper layer 344 can be applied with printing or the like.

(5) Cutting-into-Piece Step

As shown in FIG. 9E, the IC card 340 is made into individual pieces by press-cutting along a cutting plane line 40b that is the center between the adjacent IC cards 340 (the center between the plurality of combinations) in the lower layer 343 and the upper layer 344.

In the removing step, the distance between the adjacent combination of the conductive plates 342A and 342B is made wide. Therefore, in the cutting-into-piece step, the accuracy margin of cutting the lower layer 343 can be widened, and the workability can be improved.

The cutting operation can be facilitated if a print or the like indicating the cutting position is provided to at least one of the lower layer 343 and the upper layer 344.

The cutting-into-piece step is not limited to press cutting, and may employ sheet cutting.

As described above, the communication system 310 of the present embodiment achieves the following effects.

(1) At the time of manufacturing, the plurality of combinations of the conductive plates 342A and 342B can be electrically independently disposed on the lower layer 343. Therefore, before shipment or the like of the IC card 340, a function test and a connection state test can be concurrently carried out for the plurality of IC chips 341 by causing a test probe to directly contact with or approximate the conductive plates 342A and 342B, and thus the test efficiency can be improved.

(2) Since the conductive plates 342A and 342B are not exposed on the end face (cutting plane) of the IC card 340, the damage to the IC chip 341 can be reduced if overvoltage is externally applied thereto by static electricity or the like. In a case in which the IC card 340 is touched by a hand or the like, it is possible to prevent operational malfunction of the IC chip 341 caused by electrical connection with the conductive plates 342A and 342B through a human body.

(3) In a case in which the conductive plates 342A and 342B are separated in advance and disposed on the lower layer 342, it is difficult to dispose the conductive plates 342A and 342B on the lower layer 342 with high accuracy. However, in the present embodiment, the conductive thin plate 350 is disposed on the lower layer 342, and the removal area is removed to separate the conductive plates 342A and 342B from each other; therefore, the processing is simple, and the dimensional accuracy of the slit 340a can be improved.

(4) In the cutting-into-piece step, since the conductive plates 342A and 342B formed of metal foil or the like need not be cut, the deterioration of the cutting blade can be suppressed. By using the cutting technique, the step can be made shorter than the etching technique, and the processing cost can be reduced.

(5) Since the slit 350a is provided in the longitudinal cutting step, the slit 340a for the plurality of IC cards 340 can be manufactured in a single step.

Fourth Embodiment

Next, descriptions are provided for a fourth embodiment to which the present invention is applied.

In the fourth embodiment, a manufacturing method of an IC card 440 is altered from the manufacturing method in the third embodiment.

Figure 10:
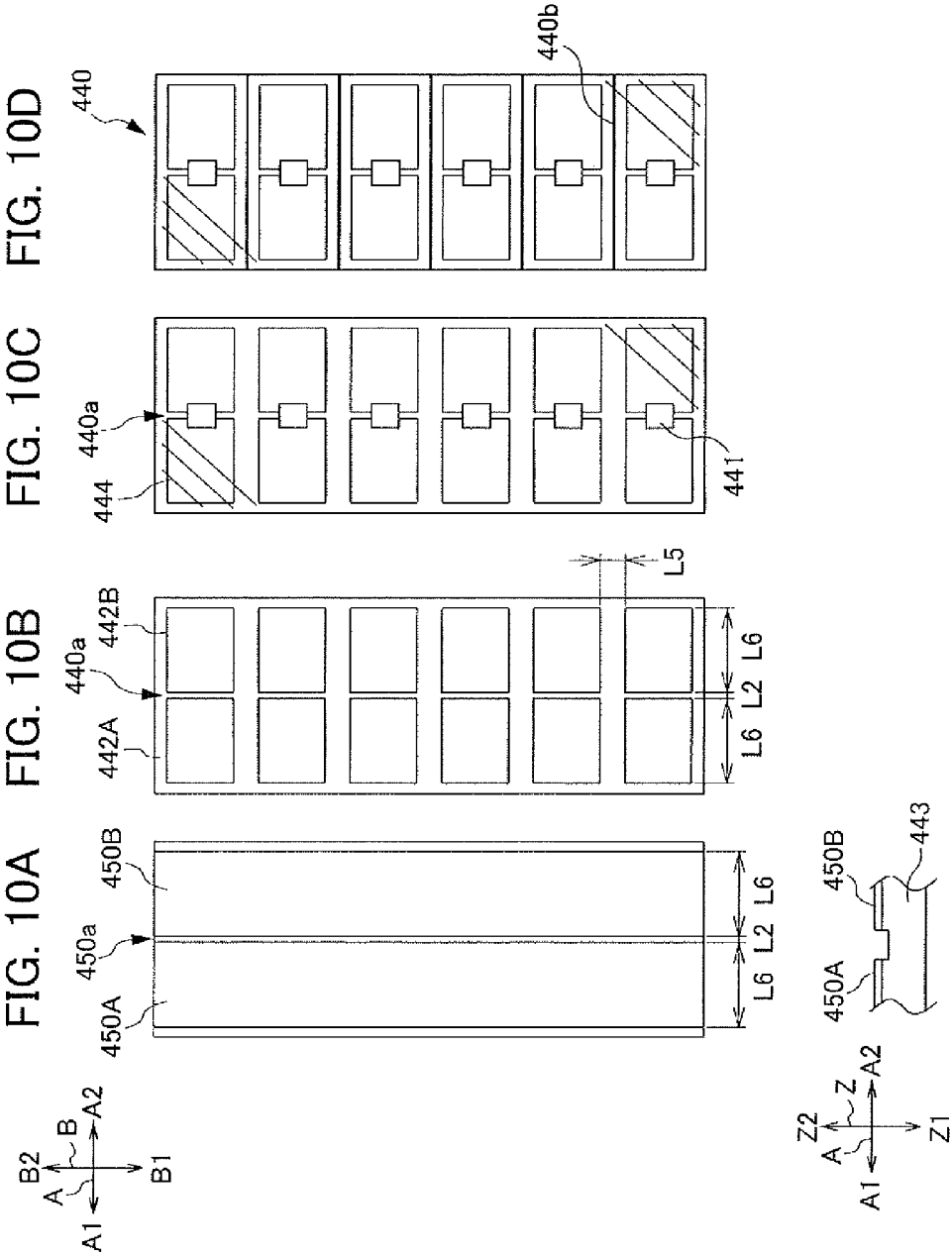
FIG. 10 is a plan view illustrating a method of manufacturing an IC card 440 of a fourth embodiment.

FIG. 10 is a plan view illustrating the method of manufacturing the IC card 440 of the fourth embodiment. In FIG. 10, drawings corresponding to the drawings of FIG. 9 are denoted with identical alphabetical suffixes, respectively.

The method of manufacturing the IC card 440 follows the following steps.

Conductive Thin Plate Forming Step

As shown in FIG. 10B, a pair of conductive thin plates 450A and 450B are disposed on a lower layer 443.

A length L6 of each of the conductive thin plates 450A and 450B in the transverse direction A is equal to the length L6 of a side of each of conductive plates 442A and 442B in the transverse direction A.

The pair of the conductive thin plates 450A and 450B is arranged in parallel in the transverse direction A, and laminated on the lower layer 443, such that a slit 450a (width L2) is provided.

Conductive Thin Plate Cutting Step

As shown in FIG. 10C, the conductive thin plate cutting step has only a lateral cutting step, in which a removal area of the conductive thin plates 450A and 450B is removed by cutting along the transverse direction A.

In this way, in the manufacturing method in the present embodiment, the conductive thin plates 450A and 450B are disposed on the lower layer 443 such that the slit 450a is provided in advance; therefore, a cutting step for forming the slit 440a is unnecessary, and the step can be shortened.

Fifth Embodiment

Next, descriptions are provided for a fifth embodiment to which the present invention is applied.

In the fifth embodiment, a manufacturing method of an IC card 540 is altered from the manufacturing method in the third embodiment.

Figure 11:
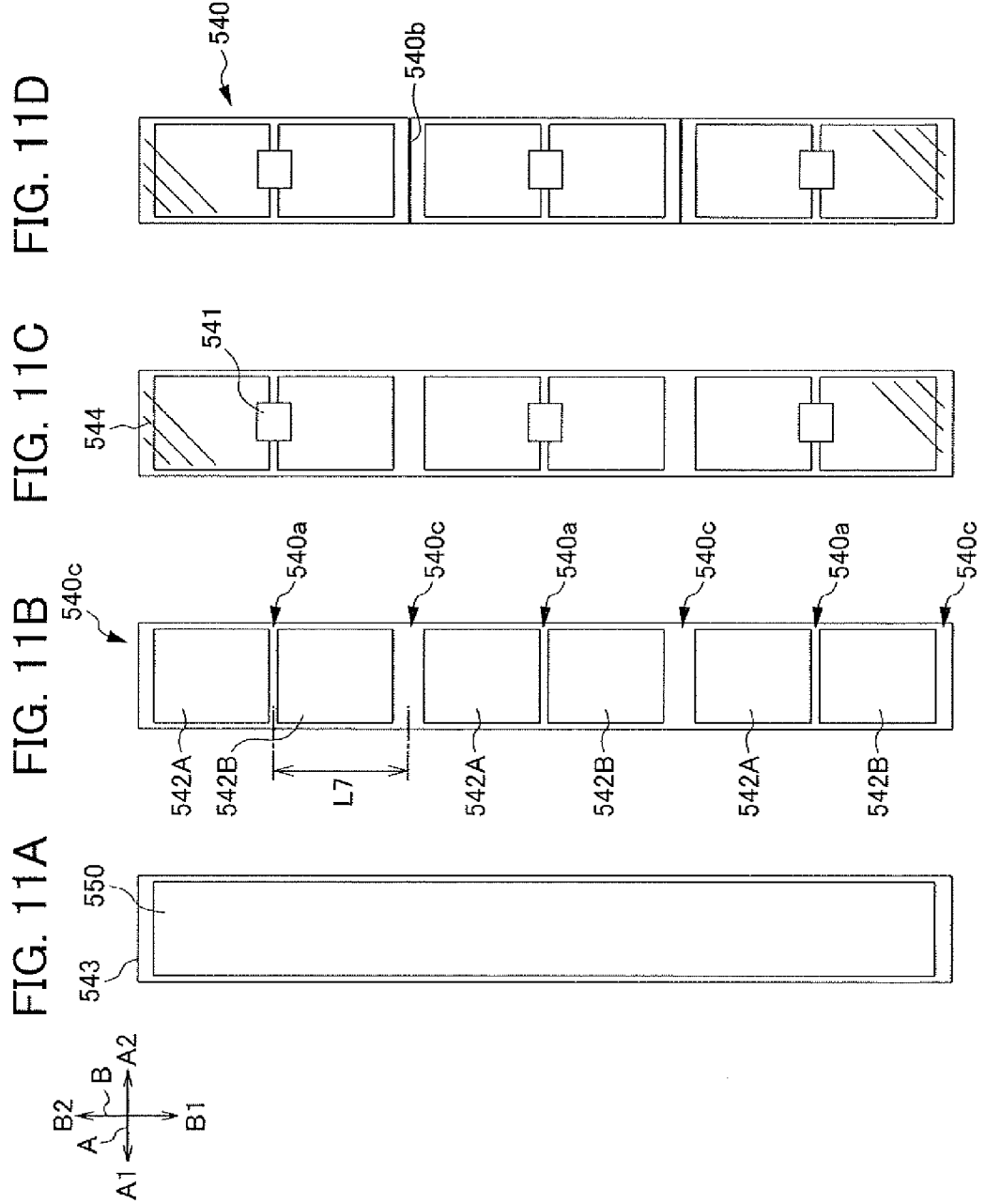
FIG. 11 is a plan view illustrating a method of manufacturing an IC card 540 of a fifth embodiment.

FIG. 11 is a plan view illustrating the method of manufacturing the IC card 540 of the fifth embodiment. In FIG. 11, drawings corresponding to the drawings of FIG. 9 are denoted with identical alphabetical suffixes, respectively.

As shown in FIG. 11, both of an arrangement direction of the IC card 540 and an arrangement direction of conductive plates 542A and 542B coincide with the longitudinal direction B.

The method of manufacturing the IC card 540 in the present embodiment follows the following steps.

Conductive Thin Plate Disposing Step

As shown in FIG. 11B, it disposes with conductive thin plate 550 on lower layer 543.

A length of the conductive thin plate 550 in the transverse direction A is equal to a length of the side of the conductive plates 542A and 542B in the transverse direction A.

Conductive Thin Plate Cutting Step

The conductive thin plate cutting step includes a slit cutting step (a between-pair-of-plate removing step), and a between-card cutting step (a between-combination removing step).

In the slit cutting step, a removal area between the pair of conductive plates 542A and 542B is removed by cutting along the transverse direction A, and a slit 540a is formed.

In the between-card cutting step, a removal area 540c between the adjacent IC cards 540 is removed by cutting along the transverse direction A.

In this way, in the manufacturing method in the present embodiment, the cutting direction in the slit cutting step and the between-card cutting step coincide with the transverse direction A. Therefore, if the cutting blades used in the steps are disposed at a distance of a length L7 between the center of the slit 540a and the center of the removal area 540c, and concurrently scan in the transverse direction A, the slit 540a and the removal area 540c can be processed as a pair in the identical step, and the steps can be shortened.

Sixth Embodiment

Next, descriptions are provided for a sixth embodiment to which the present invention is applied.

The sixth embodiment is an example of a laminating device 660 for a lower layer 643 and conductive thin plates 650A and 650B.

Figure 12:
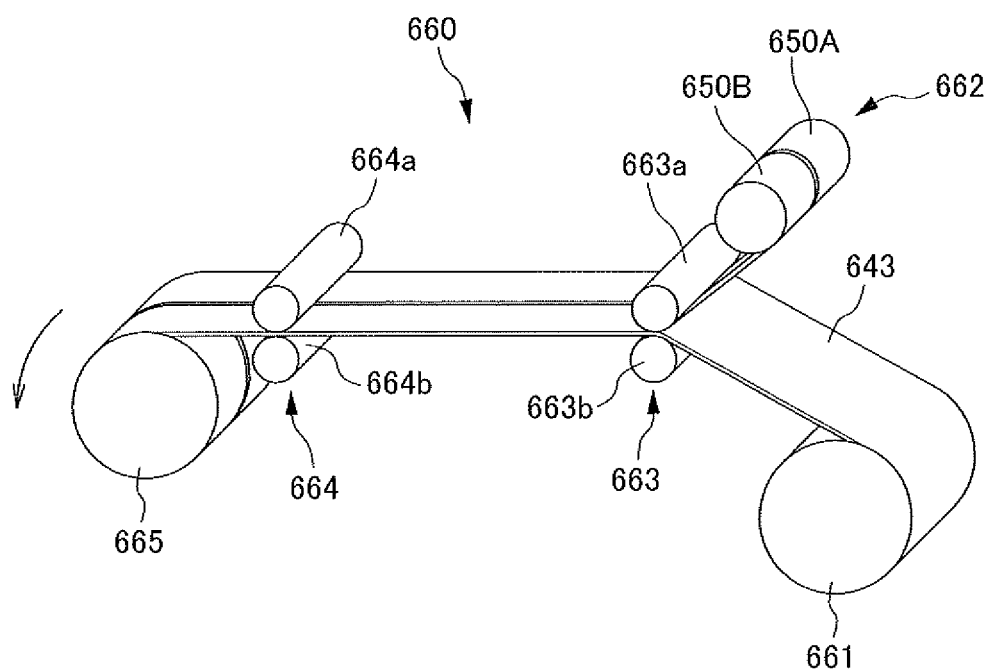
FIG. 12 is a perspective view of a laminating device 660 utilized in a laminating step of the fifth embodiment.

FIG. 12 is a perspective view of the laminating device 660 utilized in a laminating step of the sixth embodiment.

The present embodiment describes an example of laminating the conductive thin plates 650A and 650B on the lower layer 643, which is similar to the manufacturing method in the fourth embodiment.

The laminating device 660 includes a lower layer feed roll unit 661, a conductive thin plate feed roll unit 662, nip roller units 663 and 664, and a wind-up roll unit 665.

The lower layer feed roll unit 661 is a portion for feeding the lower layer 643 that has been made into the form of roll.

The conductive thin plate feed roll unit 662 is a portion for feeding the conductive thin plates 650A and 650B that have been made into the form of roll.

The lower layer 643 is fed from the lower layer feed roll unit 661, and the conductive thin plates 650A and 650B are fed from the conductive thin plate feed roll unit 662. The nip roller unit 663 interposes the lower layer 643 and the conductive thin plates 650A and 650B between an upper roller 663a and a lower roller 664b, and laminates them through pressure contact therebetween.

The nip roller unit 664 is disposed to the downstream side of the nip roller unit 663. The nip roller unit 664 further applies pressure contact against the lower layer 643 and the conductive thin plates 650A and 650B between the upper roller 664a and the lower roller 664b, and reliably laminates them.

The wind-up roll unit 665 is a roller that is rotationally driven by a driving device (not shown) to wind up the lower layer 643 and the conductive thin plates 650A and 650B thus laminated.

With the above configuration, the laminating device 660 can draw the lower layer 643 from the lower layer feed roll unit 661, and draw the conductive thin plates 650A and 650E from the conductive thin plate feed roll unit 662, and can laminate them through pressure contact with the nip roller units 663 and 664 by rotationally driving the wind-up roll unit 665. The laminating device 660 can store the lower layer 643 and the conductive thin plates 650A and 650B, which have been thus laminated, in the form of a roll by the wind-up roll unit 665.

The present embodiment has been described for the method of laminating the IC card similar to the fourth embodiment; however, the method can be diverted to the method of laminating the IC card similar to the third or fifth embodiment.

Seventh Embodiment

Next, descriptions are provided for a seventh embodiment to which the present invention is applied.

The seventh embodiment is described for a communication system that uses an electromagnetic induction ticket gate 720, a relay communication device 730, and an IC card 740.

Figure 13:
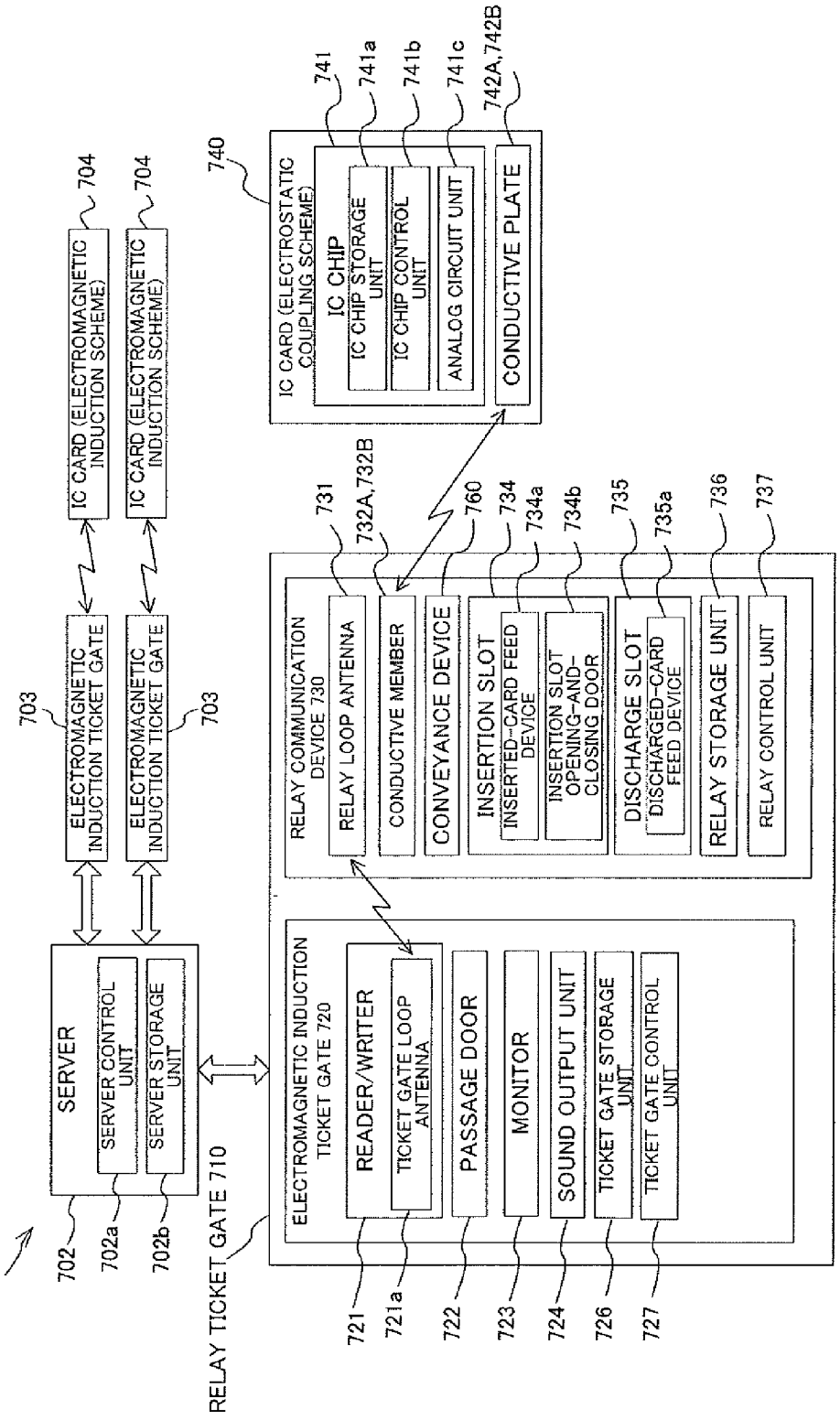
FIG. 13 is a block diagram of a ticket gate system 701 of a sixth embodiment.

FIG. 13 shows a block diagram of a relay automatic ticket gate system 701 of the seventh embodiment.

FIG. 14 is a diagram illustrating an internal configuration of the relay communication device 730 of the seventh embodiment.

FIG. 14A is a plan view of a conveyance device 760 (a cross-sectional view from a direction of an arrow a-a in FIG. 14B).

FIG. 14B is a side-view of the conveyance device 760.

The FIG. 14C is a perspective view in the vicinity of the conveyance device 760.

In the relay automatic ticket gate system 701 of the present embodiment, a configuration of the conveyance device 760 within the relay communication device 730 is different from the configuration of the conveyance device 60 within the relay communication device 30 of the relay automatic ticket gate system 1 of the first embodiment.

The conveyance device 760 is provided within the relay communication device 730.

Configuration in the Vicinity of the Conveyance Device 760

As shown in FIG. 14, the relay communication device 730 includes the conveyance device 760 and rotary connectors 770 (770a and 770b).

The conveyance device 760 includes conductive members 732A and 732B, a lower belt 761, a lower belt drive roller 762 (762a and 762b), an upper belt 763, and an upper belt drive roller 764 (764a and 764b).

The conductive members 732A and 732B are disposed on the outer periphery of the lower belt 761. The conductive members 732A and 732B rotationally and integrally move with the lower belt 761.

The lower belt 761 and the lower belt drive roller 762 are disposed on the lower side Z1 within the relay communication device 730.

The lower belt 761 is a flat belt that is wound around the lower belt drive roller 762. The lower belt 761 is formed of an insulating material.

The lower belt drive rollers 762a and 762b are two rollers for rotating the lower belt 761. One of the lower belt drive rollers 762a and 762b includes a motor that rotates the lower belt 761 such that an upper portion of the wound lower belt 761 rotationally moves in the conveyance direction Y.

The upper belt 763 and the upper belt drive roller 764 are similar to the lower belt 761 and the lower belt drive roller 762, and are disposed on the upper side Z2 within the relay communication device 730.

The rotary connector 770 is a connector for relaying between wiring lines 731a and 731b from the relay loop antenna 731 and wiring lines 732a and 732b from the conductive members 732A and 732B. One end and another end of the rotary connector 770 are rotatable. As a result, the wiring lines 731a and 731b are not entangled even if rotated by following the conductive members 732A and 732B, and the conduction with the wiring lines 731a and 731b from the relay loop antenna 731 can be maintained.

The way of connecting the conductive members 732A and 732B with the relay loop antenna 731 is not limited to the use of the rotary connector 770, so long as the conduction of the rotating conductive members 732A and 732B with the relay loop antenna 731 can be maintained. For example, connection terminals for slidingly contacting with the conductive members 732A and 732B may be connected to the relay loop antenna 731.

For example, by independently providing metallic rollers that drive the conductive members 732A and 732B wound around the rollers, respectively, the relay loop antenna 731 and the conductive members 732A and 732B may be connected through the rollers.

With the above configuration, the conveyance device 760 interposes the IC card 740, which is inserted into the insertion slot 734 (see FIG. 14), between the conductive members 732A and 732B and the upper belt 763, and conveys the IC card 740 toward the downstream side Y2 in the conveyance direction Y with the lower belt 761 and the upper belt 763 rotationally driving.

The conveyance device 760 conveys the IC card 740 in a state where conductive plates 742A and 742B of the IC card 740 are disposed to face the conductive members 732A and 732B. Therefore, it is possible to maintain the electrostatic coupling between the conductive members 732A and 732B and the conductive plates 742A and 742B of the IC card 740 being conveyed. Similarly to the conductive rails 32L and 32R and the conductive plates 42L and 42R of the first embodiment, the conductive members 732A and 732B and the conductive plates 742A and 742B of the IC card 740 are contactlessly connected through electrostatic coupling, and information can be transmitted and received therebetween.

The conductive members 732A and 732B are rotationally driven in a state of interposing the IC card 740, thereby functioning to convey the IC card 740 in the conveyance direction Y. In other words, the conductive members 732A and 732B function as a part of the conveyance device 760 as well, and double as a part of the conveyance device 760. Therefore, the configuration of the relay communication device 730 can be simplified.

The other configurations of the relay automatic ticket gate system 701 are similar to the configurations of the first embodiment. Therefore, the relay automatic ticket gate system 701 can operate the communication system 710 similarly to the first embodiment (see FIG. 6), and achieves an effect similar to the effect of the first embodiment.

If the aspect of the IC card 740 is made similar to that of the second embodiment, the relay automatic ticket gate system 701 can improve the communication stability with respect to deviation, similarly to the second embodiment. If an IC card alignment device similar to that of the second embodiment is provided (see FIG. 8), the relay automatic ticket gate system 701 can align the IC card 740.

As described above, in the communication system 710 of the present embodiment, the conductive members 732A and 732B move integrally with the IC card 740, and communicate with the conductive plates 742A and 742B of the IC card 740; therefore, communication is possible while conveying the IC card 740, and the gate access processing time and the like can be shortened.

Eighth Embodiment

Next, descriptions are provided for an eighth embodiment to which the present invention is applied.

In the following descriptions and drawings, the same symbols or the same ending symbols are assigned to portions carrying out functions similar to the seventh embodiment described above, and redundant descriptions are omitted as appropriate.

Figure 15:
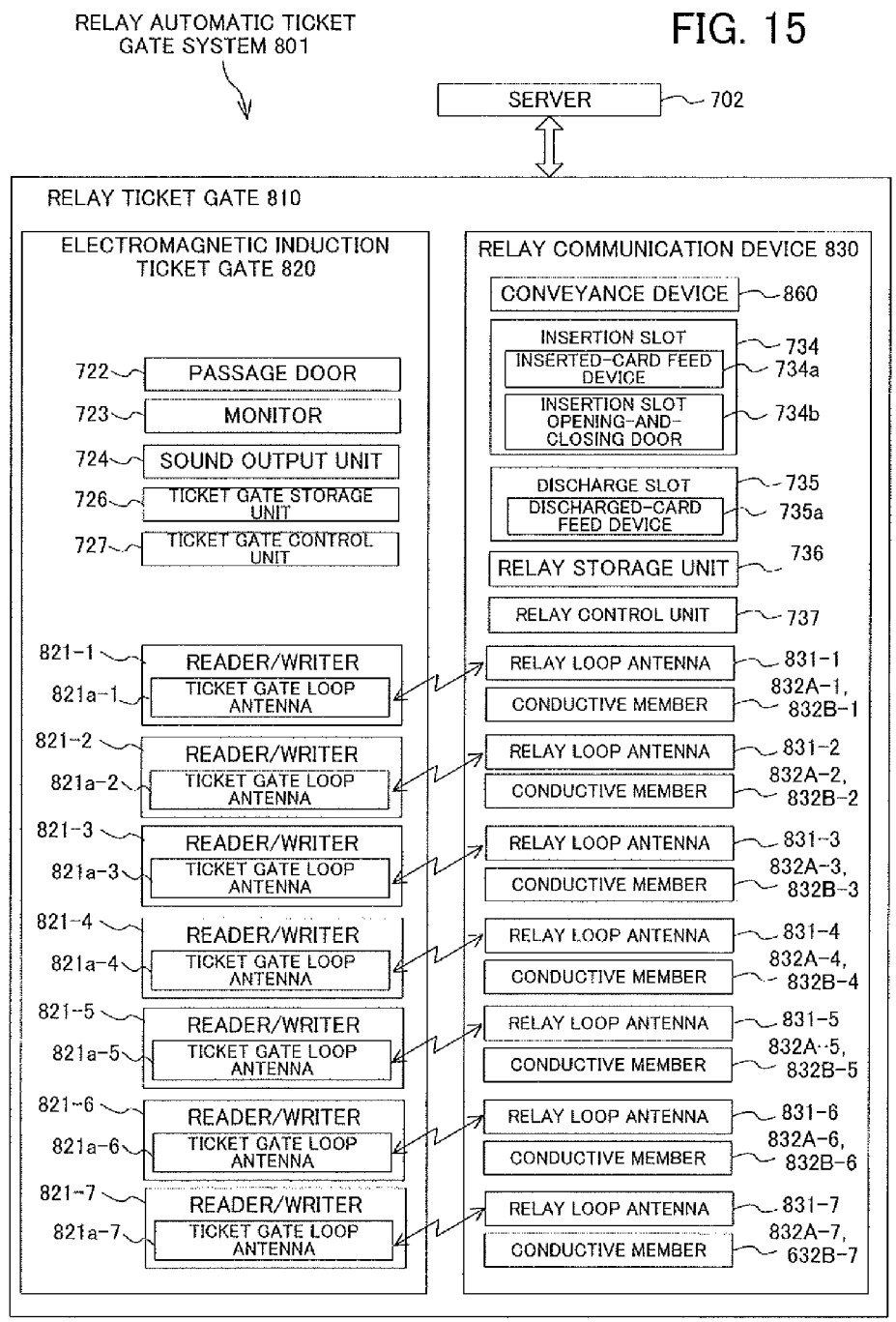
FIG. 15 is a block diagram of a ticket gate system 801 of an eighth embodiment.

FIG. 15 is a block diagram of a ticket gate system 801 of the eighth embodiment.

FIG. 16 is a diagram illustrating an internal configuration of a relay communication device 830 of the eighth embodiment.

Figure 16A:
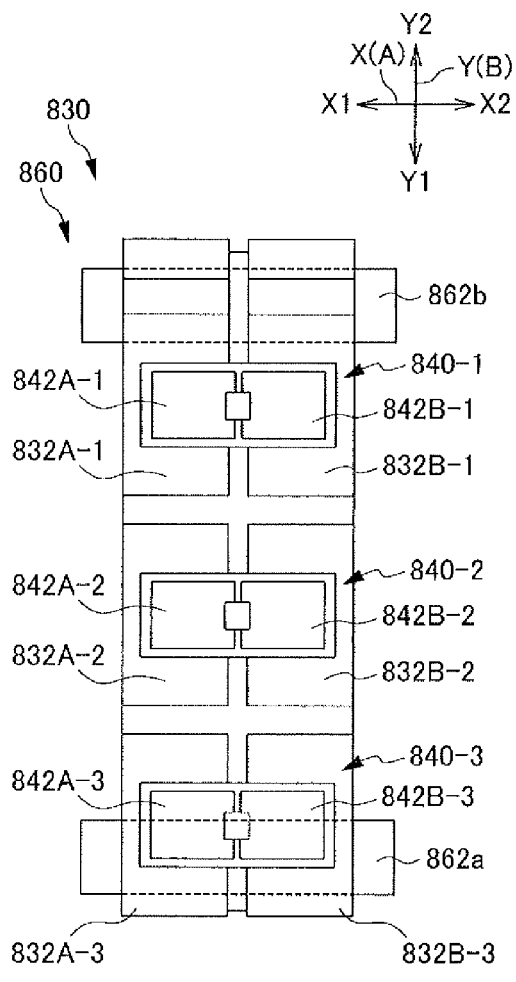
FIG. 16 is a diagram illustrating an internal configuration of a relay communication device 830 of the eighth embodiment.
Figure 16B:
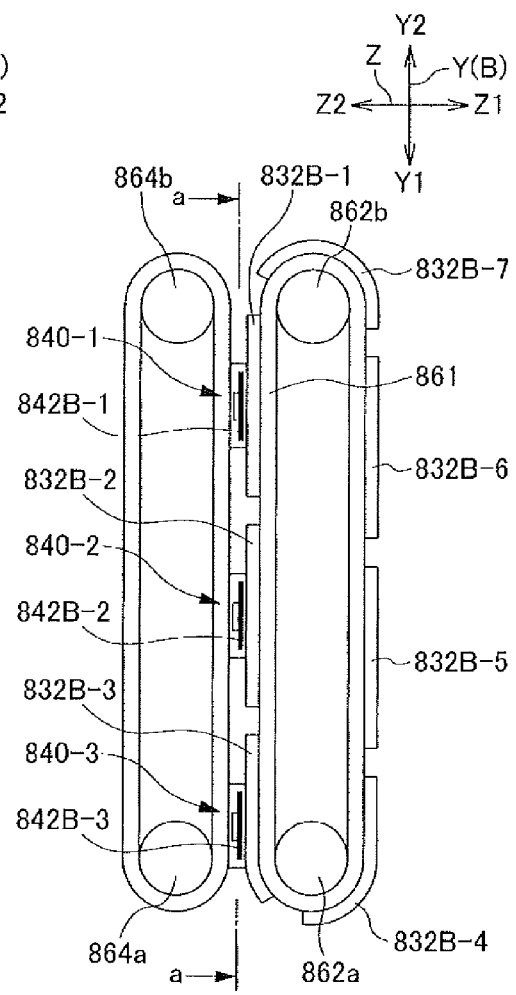

FIG. 16A is a plan view of a conveyance device 860 (a cross-sectional view from a direction of an arrow a-a in FIG. 16B).

FIG. 16B is a side-view of the conveyance device 860.

As shown in FIG. 15, the ticket gate system 801 of the present embodiment is similar to the one in the seventh embodiment in being connected to the server 502, etc., and the configuration of the communication system 810 is different from the one in the seventh embodiment. Illustration of the conventional electromagnetic induction ticket gate 503, etc. are omitted in FIG. 15.

An electromagnetic induction ticket gate 820 includes seven reader/writers 821 (821-1 to 821-7), and seven R/W loop antennas 821a (821a-1 to 821a-7) connected to the reader/writers 821-1 to 821-7, respectively.

The relay communication device 830 includes seven relay loop antennas 831 (831-1 to 831-7), and seven sets of conductive members 832A and 832B (832A-1 and 832B-1 to 832A-7 and 832B-7) connected to the relay loop antennas 831-1 to 831-7, respectively.

R/W loop antennas 821a-1 to 821a-7 of the seven reader/writers 821-1 to 821-7 are connected with the relay loop antennas 831-1 to 831-7 of the relay communication device 830, respectively, through electromagnetic induction.

As shown in FIG. 16, conductive members 832A-1 and 832B-1 are arranged in parallel in the lateral direction X, and are attached to the circumference of a lower belt 861. Other sets of conductive members 832A-2 and 832B-2 to 832A-7 and 832B-7 are arranged similarly to the conductive members 832A-1 and 832B-1. The seven sets of the conductive members 832A-1 and 832B-1 to 832A-7 and 832B-7 are arranged in parallel in the conveyance direction Y, and are disposed on the lower belt 861.

Therefore, the seven sets of the conductive members 832A-1 and 832B-1 to 832A-7 and 832B-7 can independently electrostatically couple with different IC cards 840, respectively.

FIG. 16 shows an aspect in which the conveyance device 860 conveys three IC cards 840-1 to 840-3 in the conveyance direction, while sets of conductive members 832A-1 and 832B-1 to 832A-3 and 832B-3 electrostatically couple with sets of conductive members 842A-1 and 842B-1 to 842A-3 and 842B-3 of the three IC cards 840-1 to 840-3, respectively.

As described above, in the communication system 810 of the present embodiment, the plurality of conductive members 832A and 832 can concurrently communicate with the different IC cards 840, respectively; therefore, the gate access processing time and the like can be further shortened.

Ninth Embodiment

Next, descriptions are provided for a ninth embodiment to which the present invention is applied.

Figure 17:
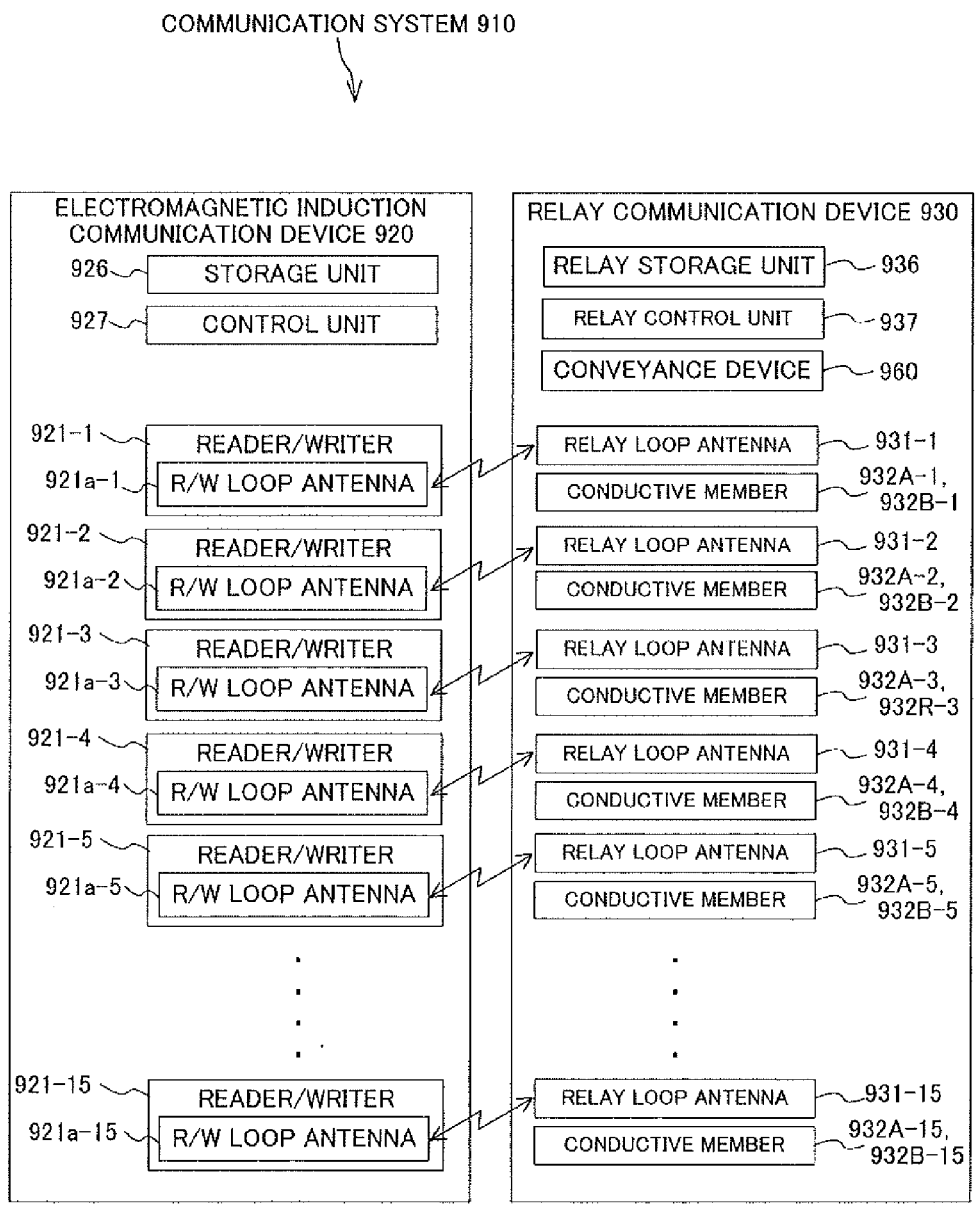
FIG. 17 is a block diagram of a communication system 910 of a ninth embodiment.

FIG. 17 is a block diagram of a communication system 910 of the ninth embodiment.

FIG. 18 is a diagram illustrating an internal configuration of a relay communication device 930 of the ninth embodiment.

Figure 18A:
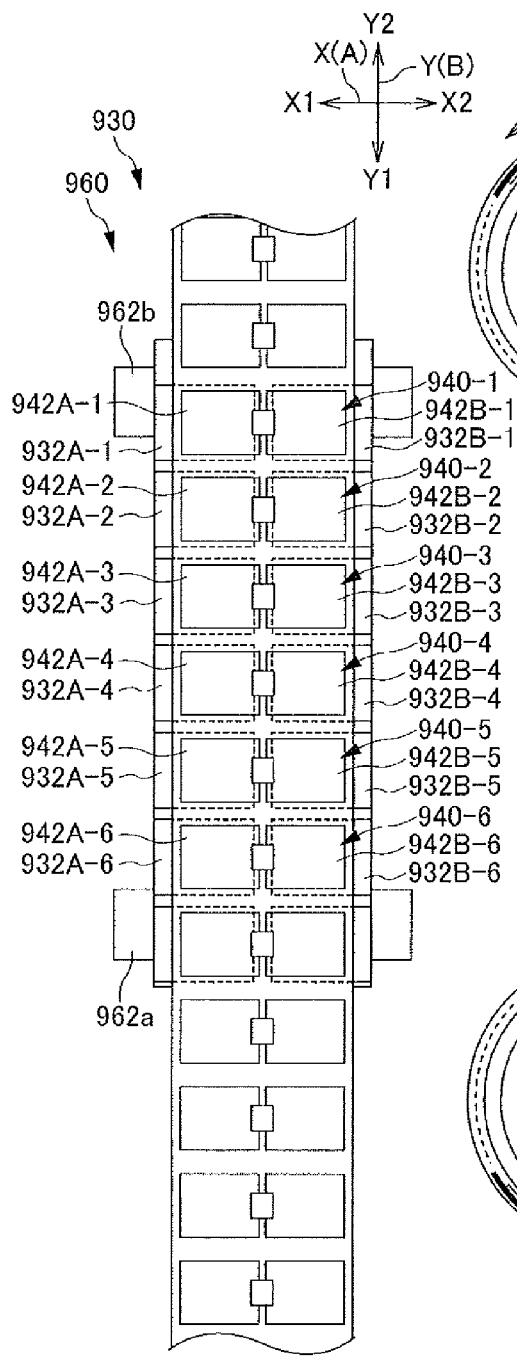
FIG. 18 is a diagram illustrating an internal configuration of a relay communication device 930 of the ninth embodiment.
Figure 18B:
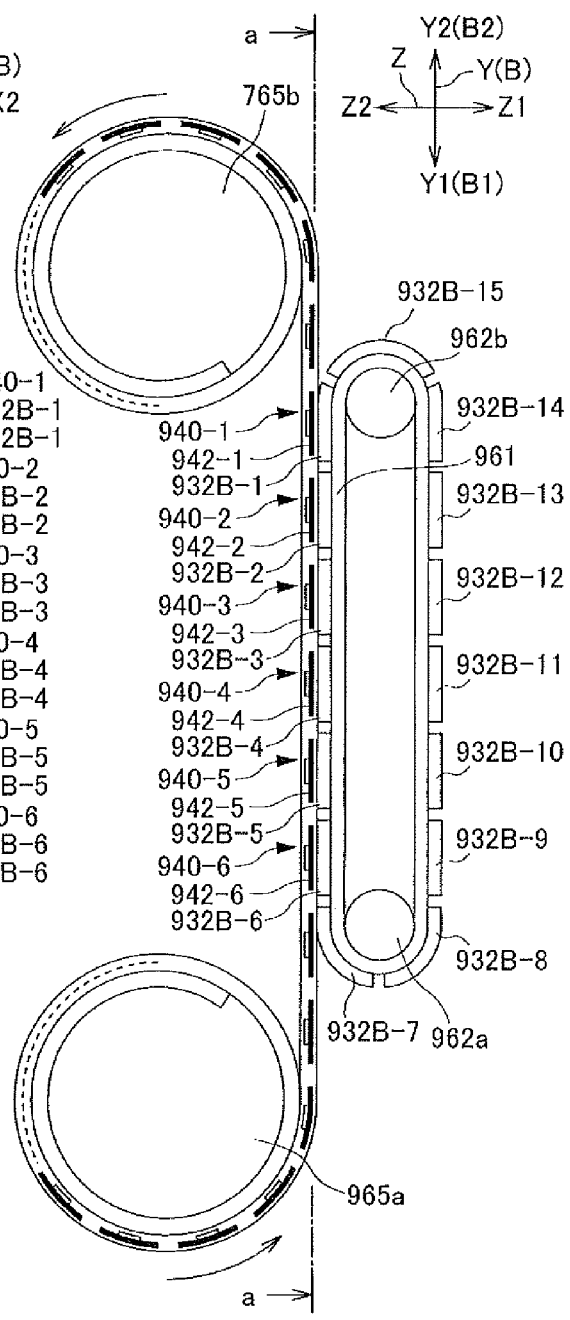

FIG. 18A is a plan view of a conveyance device 960 (a cross-sectional view from a direction of an arrow b-b in FIG. 18B).

FIG. 18B is a side-view of the conveyance device 960.

As shown in FIG. 17, the relay communication device 930 includes a relay storage unit 936, a relay control unit 937, the conveyance device 960, and conductive members 932A and 932B (932A-1 and 932B-1 to 932A-15 and 932B-15).

The relay storage unit 936 is a storage device such as semiconductor memory elements for storing programs, information, etc. required for operating the relay communication device 930.

The relay control unit 937 is a control unit for centrally controlling the relay communication device 930, and is configured by a CPU or the like, for example. By appropriately reading and executing various programs stored in a relay storage unit 926, the relay control unit 937 collaborates with the hardware described above, and implements various functions according to the present invention.

As shown in FIG. 18, in a configuration of the conveyance device 960, the number of combinations of the conductive members 932A and 932B is increased from that in the eighth embodiment, and the configuration such as the upper belt is removed therefrom. The conveyance device 960 conveys IC cards 940, and rotationally moves 14 sets of conductive members 932A-1 and 932B-1 to 932A-14 and 932B-14 in the conveyance direction Y.

The IC cards 940 to be conveyed are in a state before the cutting-into-piece step (before the cutting step), and are in a state of being arranged along the conveyance direction Y and connected with one another like a sheet by way of a lower layer and an upper layer (base materials).

The sheet-like IC cards 940 are wound around a feed roller 965a and a winding roller 965b to be described later.

The conveyance device 960 includes a lower belt 961, a lower belt drive roller 962 (962a and 962b), the feed roller 965a, and the winding roller 965b.

The feed roller 965a stores the IC cards 940 before communication in the form of a sheet. The feed roller 965a is disposed to the upstream side Y1 of the conveyance device 960.

The winding roller 965b stores the IC cards 940 after communication in the form of a sheet. The winding roller 965b includes a drive motor (not shown) that rotationally drives in a winding direction. The drive motor is controlled by the relay control unit 937.

With the above configuration, by the winding roller 965b rotationally driving, the IC cards 940 can be fed from the feed roller 965a, and wound around the winding roller 965b. As a result, the IC cards 940 are conveyed in the conveyance direction Y.

As shown in FIG. 18, the length of the conductive members 932A and 932B in the conveyance direction Y is shorter than that in the eighth embodiment, the pitch between the combinations of the conductive members 932A and 932B is shorter than that in the eighth embodiment, and the number of the combinations is greater than that in the eighth embodiment. An arrangement pitch of the conductive members 932A and 932B is identical to an arrangement pitch of the IC cards 940.

The sets of conductive members 932A-1 and 932B-1 to 932A-14 and 932B-14 are connected with relay loop antennas 931-1 to 931-14, respectively. The relay loop antennas

931-1 to 931-14 are adapted to communicate with reader/writers 921-1 to 921-14, respectively.

A configuration of the lower belt 961 and the lower belt drive roller 962 is similar to that in the eighth embodiment.

On the other hand, the conveyance device 960 of the present embodiment does not include the upper belt 863 (see FIG. 16) of the eighth embodiment. The reason is that the IC cards 940 are conveyed by the feed roller 965a and the winding roller 965b as described above. An upper belt, a suppressing roller, etc. may be provided, in order to prevent the IC cards 940 being conveyed from floating from the conductive members 932A and 932B, and to stabilize the communication processing.

Descriptions are provided for operations of the communication system 910.

The communication system 910 executes communication processing with the IC cards 940 according to the following steps.

(1) IC Card Conveying Step (Information Storage Medium Conveying Step)

As shown in FIG. 18, the relay control unit 937 drives the winding roller 965b to convey the plurality of IC cards 940 connected in the form of sheet, in the conveyance direction Y.

(2) Conductive Member Moving Step

The relay control unit 937 moves the plurality of conductive members 932A and 932B in synchronization with the plurality of IC cards 940 in the conveyance direction Y.

As a method of the synchronization, an optical sensor may be provided for detecting conveyance speed and position of the IC cards 940, and an optical sensor may be provided for detecting moving speed and position of the conductive members 932A and 932B. Based on such detection, the relay control unit 937 may make uniform the moving speed of the IC cards 940 and the conductive members 932A and 932B, and synchronize the IC cards 940 and the conductive members 932A and 932B.

(3) Electrostatic Coupling Communication Step

R/W loop antennas 921a-1 to 921a-14 of an electromagnetic induction communication device 920 independently communicate with the relay loop antennas 931-1 to 931-14 of the relay communication device 930, respectively, through electromagnetic induction.

On the other hand, the plurality of conductive members 932A and 932B moving in the conductive member moving step independently electrostatically couple with a plurality of conductive plates 942A and 942B of the IC card 940 conveyed in the IC card conveying step, respectively.

For example, FIG. 18 shows an example in which six sets of conductive plates 942A-1 and 942B-1 to 942A-6 and 942B-6 of the six IC cards 940-1 to 940-6 independently electrostatically couple with six sets of conductive members 932A-1 and 932B-1 to 932A-6 and 932B-6, respectively. As a result, the control unit 927 executes processing of communication with the IC chips of the IC cards 940-1 to 940-6, through the R/W loop antennas 921a-1 to 921a-6, the relay loop antennas 931-1 to 931-6, the sets of conductive members 932A-1 and 932B-1 to 932A-6 and 932B-6, and the sets of conductive plates 942A-1 and 942B-1 to 942A-6 and 942B-6.

The above steps are concurrently performed, in which the relay communication device 930 sequentially conveys the IC cards 940, and the electromagnetic induction communication device 920 sequentially reads information of the IC cards 940.

In the communication system 910, the relay communication device 930 and the electromagnetic induction communication device 920 may be configured as an integral device, in which the relay storage unit 936 and the relay control unit 937 of the relay communication device 930 are provided to the electromagnetic induction communication device 920.

The arrangement direction of the conductive members 932A and 932B may coincide with the conveyance direction Y instead of the lateral direction X. In this case, since the conductive members 932A and 932B are alternately arranged, communication is possible for the plurality of IC cards 540 of the fifth embodiment as well. The same applies to the eighth embodiment as well.

As described above, the communication system 910 of the present embodiment can independently communicate with the IC cards 940 moving in the conveyance direction Y. As a result, for example, the communication system 710 can shorten the test duration and the like of the IC cards 940.

The communication system 910 can perform communication in a state where the IC cards 940 are connected through the base material. As a result, for example, even in a case in which the IC cards 940 are utilized as tickets, such that the IC cards 940 are shipped as a reel to be cut into pieces by a ticket vending machine, the IC cards 940 can be tested before factory shipment.

The present embodiment has been described for an example in which the IC cards 940 as a sheet are wound around the roller 965b after being tested by the communication system 910; however, the present invention is not limited thereto.

The IC card 940 may be cut into pieces without winding after being tested by the communication system 910, and may be classified into non-defective and defective pieces by the test.

Although embodiments of the present invention have been explained above, the present invention is not to be limited to the aforementioned embodiments, and various modifications and alterations as in the modified embodiments are possible, which are also within the technical scope of the present invention. The effects described in the embodiments merely exemplify the most advantageous effects arising from the present invention, and the effects arising from the present invention are not limited to those described in the embodiments. The aforementioned embodiments and modified embodiments described later can also be used in combination as appropriate; however, detailed explanations thereof are omitted.

Modified Embodiments (1) The embodiments have been described for an example in which the reader/writer communicates with the relay communication device through electromagnetic induction; however, the present invention is not limited thereto. For example, the reader/writer and the relay communication device may communicate through electromagnetic coupling. In this case, an IC chip capable of communicating through electromagnetic coupling may be employed as the IC chip provided in the IC card.

Electromagnetic coupling is identical to electromagnetic induction in theory. Communication through electromagnetic coupling refers to communication, in which the antenna of the card faces the antenna of the reader/writer to communicate with each other through electromagnetic induction in a static state.

(3) The embodiments have been described for an example in which the relay communication device includes the conveyance device for conveying the IC card; however, the present invention is not limited thereto. For example, the user himself/herself may move while sliding the IC card on the conductive rail in the conveyance direction.

(4) The embodiments have been described for an example in which the notification unit for notifying communication failure is provided to the electromagnetic induction ticket gate; however, the present invention is not limited thereto. The notification unit may be provided to the relay communication device. In this case, when the IC card is conveyed to the suspension range, the relay control unit may determine whether communication failure occurs, and may control the notification unit, based on contents of transmission and reception between the ticket gate control unit and the IC chip to be monitored.

(6) The embodiments have been described for an example in which the relay communication device is provided to the railroad ticket gate system; however, the present invention is not limited thereto. The system can be applied to various systems such as an electronic money system, an employee ID card system, and a physical distribution management system. For example, in a case in which a register system for a shop or the like includes an electromagnetic induction reader/writer for electronic money, if a relay communication device communicating with the reader/writer is provided similarly to the embodiments, the system can be easily applied to a conventional register system, and the system can be introduced at low cost even in a case of a new register system.

The invention claimed is:

1. A communication system, comprising:
an information storage medium;
an electromagnetic induction communication device; and
a relay communication device disposed between the information storage medium and the electromagnetic induction communication device, the communication system performing communication while conveying the information storage medium,
wherein the information storage medium comprises:
an Integrated Circuit (IC) chip configured to be communicable through electromagnetic induction or electromagnetic coupling; and
a pair of electrically conductive plates connected to the IC chip,
wherein the relay communication device comprises:
a relay loop antenna;
a conveyance device configured to convey the information storage medium in a conveyance direction; and
a pair of electrically conductive rails, extending along the length of the conveyance device, which is connected to both ends of the relay loop antenna, placed along the conveyance direction of the information storage medium, and electrostatically coupled directly with the pair of electrically conductive plates of the information storage medium when the information storage medium is conveyed by the conveyance device,
wherein the electromagnetic induction communication device comprises:
a communication loop antenna configured to communicate with the relay loop antenna through electromagnetic induction or electromagnetic coupling; and
a control unit configured to execute processing of communication with the IC chip of the information storage medium, when the communication loop antenna communicates with the relay communication device through electromagnetic induction or electromagnetic coupling, and the relay communication device electrostatically couples with the information storage medium.

2. The communication system according to claim 1,
wherein the pair of electrically conductive plates of the information storage medium is juxtaposed each other with respect to a direction orthogonal to the conveyance direction.

3. The communication system according to claim 1,
wherein the relay communication device includes:
an insertion slot into which a user inserts the information storage medium; and
an alignment device configured to align the information storage medium inserted into the insertion slot, such that the pair of electrically conductive plates is juxtaposed each other with respect to the direction orthogonal to the conveyance direction.

4. The communication system according to claim 1,
wherein the information storage medium having the electrically conductive plates has a rectangular shape,
wherein the pair of electrically conductive plates is juxtaposed in parallel with each other in a direction along a long side of the rectangular shape, and
wherein the relay communication device conveys the information storage medium, such that the conveyance direction of the information storage medium is orthogonal to the long side of the rectangular shape of the information storage medium.

5. The communication system according to claim 1,
wherein the relay communication device includes a plurality of rollers, which are disposed in a plurality of openings provided at a surface of each of the electrically conductive rails, and which are arranged in the conveyance direction of the information storage medium.

6. The communication system according to claim 1,
wherein the relay communication device includes:
a section of determining a communication processing result on the pair of electrically conductive rails,
wherein the communication system includes:
a notification unit, which is provided at the electromagnetic induction communication device or the relay communication device, configured to notify the communication processing result; and
a communication result determination control unit, which is provided at the electromagnetic induction communication device or the relay communication device, configured to determine the communication processing result in a case in which the information storage medium is conveyed to the section of determining a communication processing result,
wherein the communication result determination control unit controls the notification unit to notify a failure occurrence, when determining the communication processing result to be anomalous, and
wherein the communication result determination control unit continues communication processing until completion thereof when the communication processing is in progress, and controls the notification unit to notify a failure occurrence when determining the communication processing result to be anomalous.

7. An electromagnetic induction communication device used in the communication system according to claim 1, comprising:
the communication loop antenna; and
the control unit.

8. An information storage medium used in the communication system according to claim 1, comprising:
the integrated circuit chip; and
the pair of electrically conductive plates.

9. A relay communication device comprising:
a relay loop antenna configured to communicate through electromagnetic induction or electromagnetic coupling;
a pair of electrically conductive rails, extending along the length of the conveyance device, connected to both ends of the relay loop antenna and configured for electrostatic coupling; and
a conveyance device configured to convey an information storage medium in a conveyance direction,
wherein the pair of electrically conductive rails is configured to electrostatically couple directly with a pair of electrically conductive plates of the information storage medium when the information storage medium is conveyed by the conveyance device.

10. The relay communication device according to claim 9, further comprising:
an insertion slot into which a user inserts the information storage medium; and
an alignment device configured to align the information storage medium inserted into the insertion slot, such that the pair of electrically conductive plates is juxtaposed each other with respect to a direction orthogonal to the conveyance direction.

11. The relay communication device according to claim 9,
wherein the information storage medium which has a pair of electrically conductive plates has a rectangular shape,
wherein the pair of electrically conductive plates is juxtaposed in parallel with each other in a direction along a long side of the rectangular shape, and
wherein the information storage medium is conveyed such that the conveyance direction of the information storage medium is orthogonal to a long side of the information storage medium.

12. The relay communication device according to claim 9, further comprising:
a plurality of rollers, which are disposed in a plurality of openings provided at a surface of each of the electrically conductive rails, and which are arranged in the conveyance direction of the information storage medium.

13. The relay communication device according to claim 9, further comprising:
a communication result determination control unit,
wherein a section of determining a communication processing result is provided at the pair of electrically conductive rails, and
wherein the communication result determination control unit is configured to determine the communication processing result in a case in which the information storage medium is conveyed to the section of determining a communication processing result.

* * * * *